(12) United States Patent
Mukherjee

(10) Patent No.: US 12,484,070 B2
(45) Date of Patent: *Nov. 25, 2025

(54) CARRIER AGGREGATION ENHANCEMENTS FOR NEW RADIO (NR)

(71) Applicant: Charter Communications Operating, LLC, St. Louis, MO (US)

(72) Inventor: Amitav Mukherjee, Elk Grove, CA (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/420,130

(22) Filed: Jan. 23, 2024

(65) Prior Publication Data

US 2024/0172241 A1 May 23, 2024

Related U.S. Application Data

(63) Continuation of application No. 17/071,952, filed on Oct. 15, 2020, now Pat. No. 11,882,565.

(51) Int. Cl.
| H04W 72/23 | (2023.01) |
| H04W 56/00 | (2009.01) |
| H04W 72/0453 | (2023.01) |
| H04W 72/30 | (2023.01) |
| H04W 72/53 | (2023.01) |
| H04W 74/0833 | (2024.01) |

(52) U.S. Cl.
CPC ....... *H04W 72/23* (2023.01); *H04W 56/0045* (2013.01); *H04W 72/0453* (2013.01); *H04W 72/30* (2023.01); *H04W 72/53* (2023.01); *H04W 74/0833* (2013.01)

(58) Field of Classification Search
None
See application file for complete search history.

(56) References Cited

U.S. PATENT DOCUMENTS

2019/0215870 A1* 7/2019 Babaei .................. H04L 5/0092
2021/0345148 A1* 11/2021 Lin ........................ H04L 5/0094
2022/0046522 A1* 2/2022 Kim ..................... H04W 52/365
(Continued)

FOREIGN PATENT DOCUMENTS

WO WO-2021088016 A1 * 5/2021

*Primary Examiner* — Saumit Shah
(74) *Attorney, Agent, or Firm* — Straub & Straub; Michael P. Straub; Stephen T. Straub

(57) ABSTRACT

Methods and apparatus for supporting use of multiple bandwidth parts, some of which are in a dormant state from the perspective of a User Equipment device (UE) are described. In various embodiments a multi-cell grant is supported in which a UE can be, and sometimes is, granted resources corresponding of an active bandwidth part (BWP) corresponding to a cell which is active from the UE's perspective and a BWP of a dormant cell with the multi-cell grant being transmitted to the UE on the active BWP of the active cell. Various features relate to timing determination operations used to determine downlink and/or uplink timing to be used for bandwidth portions corresponding to a dormant cell. In some embodiments a UE PRACH signal transmission on a bandwidth part of a dormant cell can be triggered by a control signal sent on a bandwidth part of an active cell.

18 Claims, 18 Drawing Sheets

(56) References Cited

U.S. PATENT DOCUMENTS

2022/0052829 A1* 2/2022 Kim ................... H04L 5/0098
2023/0239811 A1* 7/2023 Koskela ............ H04W 72/0457
370/329

* cited by examiner

| INDEX | SS/PBCH BLOCK AND CORESET MULTIPLEXING PATTERN | NUMBER OF RBs | NUMBER OF SYMBOLS | OFFSET (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | -41 if kSSB = 0<br>-42 if kSSB > 0 |
| 5 | 2 | 24 | 1 | 25 |
| 6 | 2 | 48 | 1 | -41 if kSSB = 0<br>-42 if kSSB > 0 |
| 7 | 2 | 48 | 1 | 49 |
| 8 | RESERVED | | | |
| 9 | RESERVED | | | |
| 10 | RESERVED | | | |
| 11 | RESERVED | | | |
| 12 | RESERVED | | | |
| 13 | RESERVED | | | |
| 14 | RESERVED | | | |
| 15 | RESERVED | | | |

FIGURE 3

| INDEX | SS/PBCH BLOCK AND CORESET MULTIPLEXING PATTERN | NUMBER OF RBs | NUMBER OF SYMBOLS | OFFSET (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | -41 if kSSB = 0<br>-42 if kSSB > 0 |
| 5 | 2 | 24 | 1 | 25 |
| 6 | 2 | 48 | 1 | -41 if kSSB = 0<br>-42 if kSSB > 0 |
| 7 | 2 | 48 | 1 | 49 |
| 8 | 2 | 48 | 1 | 283 |
| 9 | RESERVED | | | |
| 10 | RESERVED | | | |
| 11 | RESERVED | | | |
| 12 | RESERVED | | | |
| 13 | RESERVED | | | |
| 14 | RESERVED | | | |
| 15 | RESERVED | | | |

FIGURE 11

CARRIER AGGREGATION ENHANCEMENTS FOR NEW RADIO (NR)

RELATED APPLICATIONS

The present application is a continuation of U.S. patent application Ser. No. 17/071,952 filed on Oct. 15, 2020 and published as US 2022-0124786 A1 on Apr. 21, 2022, said application and publication hereby being expressly incorporated by reference in their entirety.

FIELD

The present application relates to communications methods and apparatus, and more particularly, to carrier aggregation enhancements for new radio (NR), e.g. above 52.6 GHz.

BACKGROUND

A Rel-17 study Item on extending New Radio (NR) operation to the frequency range of 52.6 GHz-71 GHz is in progress since May 2020, see RP-200902, Revised SID Study on supporting NR above 52.6 GHz, 2020 which is hereby incorporated by reference in its entirety. This feature targets utilization of the very wide unlicensed and licensed spectrum bandwidths in this frequency range. The study item objectives include: i) the study of required changes to NR using existing downlink/uplink (DL/UL) NR waveform to support operation between 52.6 GHz and 71 GHz including the study of applicable numerology including subcarrier spacing, channel bandwidth (BW) including maximum BW, and their impact to Frequency Range 2 (FR2) physical layer design to support system functionality considering practical radio frequency (RF) impairments; and ii) identify potential critical problems to physical signal/channels, if any.

It is expected that new Orthogonal Frequency Division Multiplexing (OFDM) numerologies, such as a Sub-Carrier Spacing (SCS) of 960 kHz, will be introduced for this frequency range in order to combat increased phase noise.

The follow up Rel-17 Working Intergroup (WI) on extending NR operation to the frequency range 52.6 GHz-71 GHz will address physical-layer aspects and procedures impacted by the study item recommendations.

A separate Rel-17 on enhancements for dynamic spectrum sharing (DSS) also includes several carrier aggregation enhancements such as scheduling Primary Cell (PCell) from a secondary cell (SCell), and multi-cell scheduling via a single Downlink Control Information (DCI) message.

Rel-16 NR-Unlicensed (NR-U) features a wideband mode of operation where a single Bandwidth Part (BWP) can be larger than the Listen-Before-Talk (LBT) bandwidth of 20 MHz, e.g., the BWP is 80 MHz wide. Configurable intra-carrier guard bands are defined for this mode to prevent interference leaking into LBT bandwidths that did not clear LBT.

Carrier aggregation (CA) is a key technique in NR for operation across wide bandwidths. In Frequency Range 2 (FR2) (up to 52.6 GHz in Rel-16), a single component carrier (CC) can currently be up to 800 MHz in bandwidth, and a maximum of 16 CCs can be aggregated by a user equipment (UE). CA is supported for both contiguous and non-contiguous CCs.

Timing Advance (TA) is used to adjust the uplink frame timing relative to the downlink frame timing, and is provided to the UE by the gNodeB (gNB) in MAC Control Element (CE) commands transmitted on Downlink Shared Channel (DL-SCH). A UE with multiple timing advance capability for CA can simultaneously receive and/or transmit on multiple Component Carriers (CCs) corresponding to multiple serving cells with different timing advances (multiple serving cells grouped in multiple Timing Advance Groups (TAGs). Serving cells having uplink (UL) to which the same timing advance applies and using the same timing reference cell are grouped in a TAG. Each TAG contains at least one serving cell with configured uplink, and the mapping of each serving cell to a TAG is configured by Radio Resource Control (RRC).

For the primary TAG the UE uses the PCell as timing reference. In a secondary TAG, the UE may use any of the activated SCells of this TAG as a timing reference cell, but should not change it unless necessary.

TA commands can be either relative (an adjustment to the current TA) or absolute (for example, during initial access when no TAG ID or prior TA has been established).

The relative Timing Advance command MAC CE is identified by MAC subheader with Logical Channel ID (LCID) codepoint index of 61. See, e.g., RP-200902, Revised SID Study on supporting NR above 52.6 GHz, 2020 which is hereby expressly incorporated by reference in its entirety.

FIG. 1 is a drawing 100 which shows the format for a relative time advance command 102. It has a fixed size and consists of a single octet 108 (8 bits 110) defined as follows: i) TAG Identity (TAG ID) 104: This field 104 indicates that TAG Identity of the addressed TAG. The TAG containing the Special Cell (SpCell) has the TAG Identity 0. The length of the TAG ID field 104 is 2 bits; ii) Timing Advance Command 106: This 6-bit field 106 indicates the index value TA (0, 1, 2 . . . 63) used to control the amount of timing adjustment that MAC entity has to apply. For a subcarrier spacing (SCS) of $2\mu \times 15$ kHz, the TA command indicates the change of the uplink timing relative to the current uplink timing for the TAG in multiples of $16 \times 64 \times TC/2\mu$.

The Absolute Timing Advance Command MAC CE is identified by MAC subheader with Logical Channel ID (LCID) codepoint index of 38. It has a fixed size and consists of two octets defined as follows: i) Timing Advance Command: This field indicates the index value TA used to control the amount of timing adjustment; ii) Four R: Reserved bits, set to "0".

A subset of the total cell bandwidth of a cell is referred to as a Bandwidth Part (BWP) and bandwidth adaptation is achieved by configuring the UE with BWP(s) and instructing the UE which of the configured BWPs is currently the active one. Only one UL BWP for each uplink carrier and one DL BWP or only one DL/UL BWP pair can be active at a time in an active serving cell. In unpaired spectrum, the DL and UL BWPs of a UE are generally configured using the same frequency resources.

Several Carrier Aggregation (CA) enhancements have been introduced for NR in Rel-16. For example, one CA enhancement is the notion of dormant bandwidth part/SCell for faster BWP switching/SCell activation. See, e.g., RP-200902, Revised SID Study on supporting NR above 52.6 GHz, 2020 which is hereby expressly incorporated by reference in its entirety. One dormant BWP can be configured for a SCell. If the active BWP of the activated SCell is a dormant BWP, the UE stops monitoring Physical Downlink Control Channel (PDCCH) on the SCell but continues performing Channel Status Information (CSI) measurements, Automatic Gain Control (AGC) and beam management, if configured. This can be performed based on Tracking Reference signal (RS) (TRS) transmissions on the dormant BWP, for example.

Another CA enhancement is Downlink Control Information (DCI) is used to control entering/leaving the dormant BWP for one or more SCell(s) or one or more SCell group(s). The dormant BWP is one of the UE's dedicated BWPs configured by network via dedicated RRC signaling. The SpCell and Physical Uplink Control Channel (PUCCH) SCell cannot be configured with a dormant BWP. RAN Working Group 4 (WG4) discussed the necessity of periodic Uplink Sounding Reference Signal (UL SRS) transmissions on a dormant BWP, but this is not currently supported in Rel-16.

The Downlink Control Information (DCI) Formats 0_1 for Physical Uplink Shared Channel (PUSCH) and 1_1 for Physical Downlink Shared Channel (PDSCH) convey entering/leaving dormancy state. For example, Format 1_1 contains the following SCell dormancy Indication field see 3GPP TS 38.331 V16.0.0, "NR: Radio resource control (Release 16)," 2020 which is hereby expressly incorporated by reference int its entirety.

SCell dormancy indication field—0 bit if higher level parameter Scell-groups-for-dormancy-within-active-time is not configured; otherwise, 1, 2, 3, 4 or 5 bits bitmap determined according to higher layer parameter Scell-groups-for-dormancy-within-active-time, where each bit corresponds to one of SCell group(s) configured by the higher level parameter Scell-groups-for dormancy-within active-time, with most significant bit (MSB) to least significant bit (LSB) of the bitmap corresponding to the first to last configured SCell group. The field is only present when this format is carried by Physical Downlink Control Channel (PDCCH) on the primary cell with Discontinuous Reception (DRX) Active Time and UE is configured with at least two SL BWPs for an SCell.

If a UE is provided search space sets to monitor PDCCH for detection of DCI format 0_1 and DCI format 1_1 and if one or both of DCI format 0_1 and DCI format 1_1 include a SCell dormancy indication field:
  i) the SCell dormancy indication field is a bitmap with size equal to the number of groups of configured SCells, provided by Scell-groups-for-dormancy-within-active-time,
  ii) each bit of the bitmap corresponds to a group of configured SCells from the number of groups of configured Scells;
  iii) if the UE detects a DC format 0_1 or a DCI format 1_1 that does not include a carrier indicator field, or detects a DCI format 0_1 or 1_1 that includes a carrier indicator field with a value equal to 0—a '0' value for a bit of the bitmap indicates an active DL BWP, provided by dormant-BWP, for the UE for each activated SCell in the corresponding group of configured SCells;
  a '1' value for a bit of the bitmap indicates:
    an active DL BWP, provided by first-non-dormant-BWP-ID-for-DCI-inside-active-time, for the UE for each activated SCell in the corresponding group of configured SCells, if a current active DL BWP is the dormant DL BWP
    a current active DL BWP, for the UE for each activated SCell in the corresponding group of configured SCells, if the current active DL BWP is not the dormant DL BWP;
    the UE sets the active DL BWP to the indicated active DL BWP.

With regard to the dormant BWP, the RRC configuration for the ServingCellConfig IE includes (see e.g., 3GPP TS 38.212 V16.2.0, "NR; Multiplexing and channel coding (Release 16), 2020 which is hereby incorporated by reference in its entirety): i) a dormancyGroupWithinActiveTime field; ii) a dormancyGroupOutsideActiveTime field; iii) a dormantBWP-Id field; iv) a firstOutsideActiveTimeBWP-Id field; v) a firstWithinActiveTimeBWP-Id field; vi) an outsideActiveTimeConfig field; and vii) a withinActiveTimeConfig field.

The dormancyGroupWithinActiveTime field contains the ID of an SCell group for Dormancy within active time, to which the SCell belongs. The use of the Dormancy within active time SCell groups is specified in TS 38.213[13].

The dormancyGroupOutsideActiveTime field contains the ID of an SCell group for Dormancy outside active time, to which the SCell belongs. The use of the Dormancy outside active time SCell groups is specified in TS 38.213 [13].

The dormantBWP-Id field contains the ID of the downlink bandwidth part to be used as the BWP. If this field is configured, its value is different from defaultDownlinkBWP-Id, and at least one of the withinActiveTimeConfig and outsideActiveTimeConfig should be configured.

The firstOutsideActiveTimeBWP-Id field contains the ID of the downlink bandwidth part to be activated when receiving a DCI indication for SCell dormancy outside active time.

The firstWithinActiveTimeBWP-Id field contains the ID of the downlink bandwidth part to be activated when receiving a DCI indication for SCell dormancy within active time.

The outsideActiveTimeConfig field contains the configuration to be used for SCell dormancy outside active time, as specified in TS.38.213[13]. This field can only be present when the cell group the SCell belongs to is configured with dcp-Config.

The withinActiveTimeConfig field contains the configuration to be used for SCell dormancy within active time, as specified in TS.38.213[13].

FIG. 2 is a drawing 200 illustrating an exemplary channel bandwidth 302 with channel edges 222, 224. The channel bandwidth includes a lower guard band 208, a carrierBandwidth 204, and an upper guard band 220. Point A 206 is referred to as absoluteFrequencyPointA, which is at channel edge 222. The Synchronization Signal Block (SSB) 214 includes 20 Resource Blocks (RBs) and is at absolute Frequency SSB 216. Common Resource Blocks (CRBs) 218 are above the SSB 214.

The Synchronization Signals/Physical Broadcast Channel (SS/PBCH) block 214 is transmitted periodically to facilitate initial access, radio link monitoring and mobility measurements on a NR cell. One SS/PBCH block 214 spans four OFDM symbols in time and 20 Physical Resource Block (PRBs) in frequency. Parameter kSSB 212 is the subcarrier offset from subcarrier 0 in common resource block N_"CRB"^"SSW" to subcarrier 0 of the SS/PBCH block, where N_"CRB"^"SSB" is obtained from the higher level parameter offsetToPointA 210 and 4 least significant bits are given by the higher-layer parameter ssb-SubcarrierOffset and for SS/PBCH type A the most significant bit is given by a_(A+5) in the PBCH payload as defined in clause 7.1.1 of [3GPP TS 38.212 V16.2.0, "NR; Multiplexing and channel coding (Release 16), 2020, TS 38.212]. If ssb-SubcarrierOffset is not provided, k_"SSB" 212 is derived from the frequency difference between the SS/PBCH block 214 and Point A 206.

The SS/PBCH block 214 can point to the time and frequency location of an accompanying Type-0 PDCCH search space that contains the PDSCH resource allocation for Remaining Minimum System information/System Information B1 (RMSI/SIB1) needed to complete initial access. The location of the Type-0 PDCCH is indicated in pdcch-configSIB1 in the Master Information Block (MIB) of the PBCH. An example is shown in FIG. 3 for the case of SS/PBCH having a SCS of 240 kHz and Type-0 PDDCCH (CORESET0) has a SCS of 120 kHZ SCS (See e.g., Table 13-10, 3GPP TS 38.213 V16.2.0, "NR; Physical layer procedures for control (Release 16)," 2020 which is hereby expressly incorporated by reference in its entirety).

Table 300 of FIG. 3 includes a first column 302 including index, a second column 304 including the SS/PBCH block and CORESET multiplexing pattern, a third column 306 including the number of RBs, a fourth column 308 including the number of symbols and a fifth column 310 including an offset (in RBs). Rows for index values of 0 . . . , 7 are defined, while index values of 8-15 are reserved.

The UE determines from MIB that a Control Resource Set (CORESET) for Type0-PDCCH Common Search Space (CSS) set is not present if kSSB>23 for FR1 or if kSSB>11 for FR2; the CORESET for Type0-PDCCH CSS set may be provided by PDCCH-ConfigCommon.

If a UE detects a first SS/PCH block and determines that a CORESET for Type0-PDCCH CSS set is not present, and for 24<kSSB<29 for FR1 and for 12<kSSB<13 for FR2, the UE may determine the nearest (in the corresponding frequency direction) global synchronization channel number (GSCN) of a second SS/PBCH block having a CORSET for an associated Type0-PDCH CSS set as N (Reference, GSCN)+N(Offset,GSCN). N(Reference, GSCN) is the Global Synchronization Channel Number (GSCN) of the first SS/PBCH block and N (Offset, GSCN) is a GSCN offset as in the Table of FIG. 4 for FR2.

FIG. 4 is an exemplary table 400 used to determine the nearest (in the corresponding frequency direction) global synchronization channel number of a second SS/PBCH block. Table a first column 400 including exemplary kSSB values, a second column 404, and a third column 406 identifying GSCN offset values.

Carrier aggregation is an essential feature to utilize the multiple GHz of bandwidth available between 52.6 and 71 GHz. It is expected that the maximum BW of a single New Radio Component Carrier (NR CC) will be increased to around 2 GHz, similar to IEEE 802.11ad and 802.11ay channelization. This frequency range has much higher propagation loses compared to Rel-15/16 NR deployments and is more susceptible to beam misalignment, time-frequency synchronization errors due to phase noise, oxygen absorption losses, blockages and deep shadowing effects. Therefore, robust and low latency CA operation is required to properly leverage the wide bandwidths herein.

Based on the above discussion, there is a need for new methods and apparatus to enhance New Radio Carrier Aggregation (NR CA), e.g., in the frequency range 52.6 GHz-71 GHz.

SUMMARY

Methods and apparatus for supporting use of multiple bandwidth parts (BWPs), some of which are in a dormant state from the perspective of a User Equipment device (UE) are described.

In various embodiments a multi-cell grant is supported in which a UE can be, and sometimes is, granted resources corresponding of an active bandwidth part (BWP) corresponding to a cell which is active from the UE's perspective and a BWP of a dormant cell with the multi-cell grant being transmitted to the UE on the active BWP of the active cell. Thus in at least some embodiments a UE can receive a multi-cell grant using an active BWP and be granted resources on both the active BWP and a dormant BWP.

In various embodiments a UE being granted resources corresponding to a dormant cell can begin using the granted resources without monitoring the physical downlink control channel of the dormant cell.

In some embodiments a control signal to trigger a PRACH signal transmission on a dormant BWP is sent to a UE on a first active BWP of an active first cell. In such an embodiment the control signal sent on the active BWP triggers transmission of a PRACH signal on the dormant BWP which is then measured at the second cell. The second cell then sends timing control information to the UE for controlling uplink timing in the second BWP.

By allowing a control signal sent in an active BWP of an active cell to trigger a PRACH on a dormant BWP, the methods facilitate timing control relating to a dormant BWP and can reduce the latency associated with using the dormant BWP for uplink transmissions as compared to other systems.

While PRACH signaling is used in some embodiments to facilitate timing control of an uplink transmission corresponding to a dormant cell, in other embodiments the timing advance to be used for uplink transmissions made using a BWP of a dormant cell is determined based on the timing advance of an active cell and a timing difference between the cells which is determined based on downlink signals from the active and dormant cells. In some such embodiment the timing advance used for the uplink of the BWP of the dormant cell is determined based on i) a timing offset between a first active cell and the dormant cell with the difference being determined from downlink signals received from said first and second cells; ii) a timing advance for the first cell, said timing advance for the first cell being based on at least one timing advance control signal that was received from the first cell and optionally iii) a TAG time offset to be used when computing the timing advance for the dormant cell from the timing advance for the first active cell.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 3 is a table illustrating exemplary information corresponding to a SS/PBCH in accordance with Rel-16.

FIG. 11 is a table illustrating an example, in accordance with an exemplary embodiment, in which a SSB/PBCH of a dormant BWP/Scell communicates an inter-cell RB offset of 283 resource block (RBs) following the SCS of the detected SS/PBCH block, said offset identifying a CORE-SET of information in a currently active BWP/SCell, which may be used by a UE to quickly initialize and operate in the active BWP/SCell.

DETAILED DESCRIPTION

A feature of some exemplary embodiments, in accordance with the present invention, is the ability to schedule resource allocations across multiple Bandwidth Parts (BWPs) (typically of a cell group or of a cell) with a single Downlink Control Information (DCI) format via a single Physical Downlink Control Channel (PDCCH) transmission.

An exemplary use case is to schedule downlink (DL) or uplink (UL) resource allocation with a single Downlink Control Information (DCI) across two frequency-adjacent BWPs: one active (with PDCCH monitoring) and one dormant.

Figure 1:
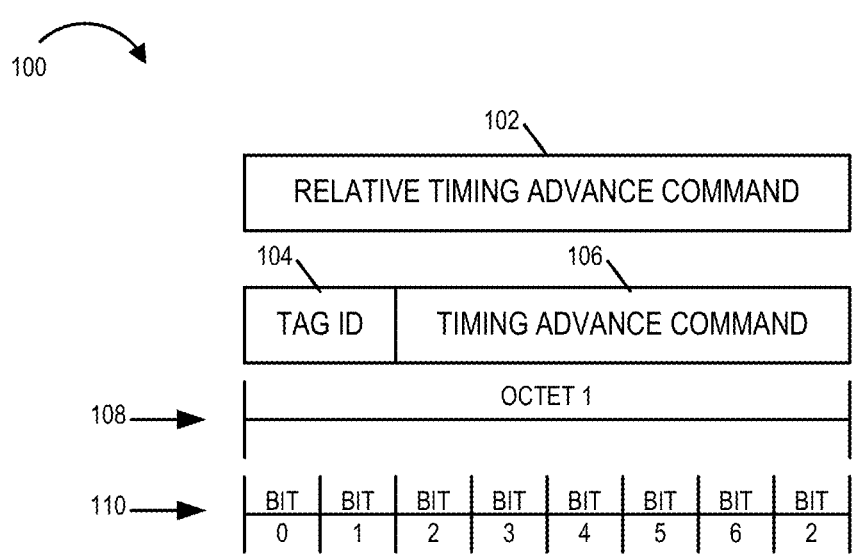
FIG. 1 is a drawing illustrating format for a relative timing advance command.
Figure 2:
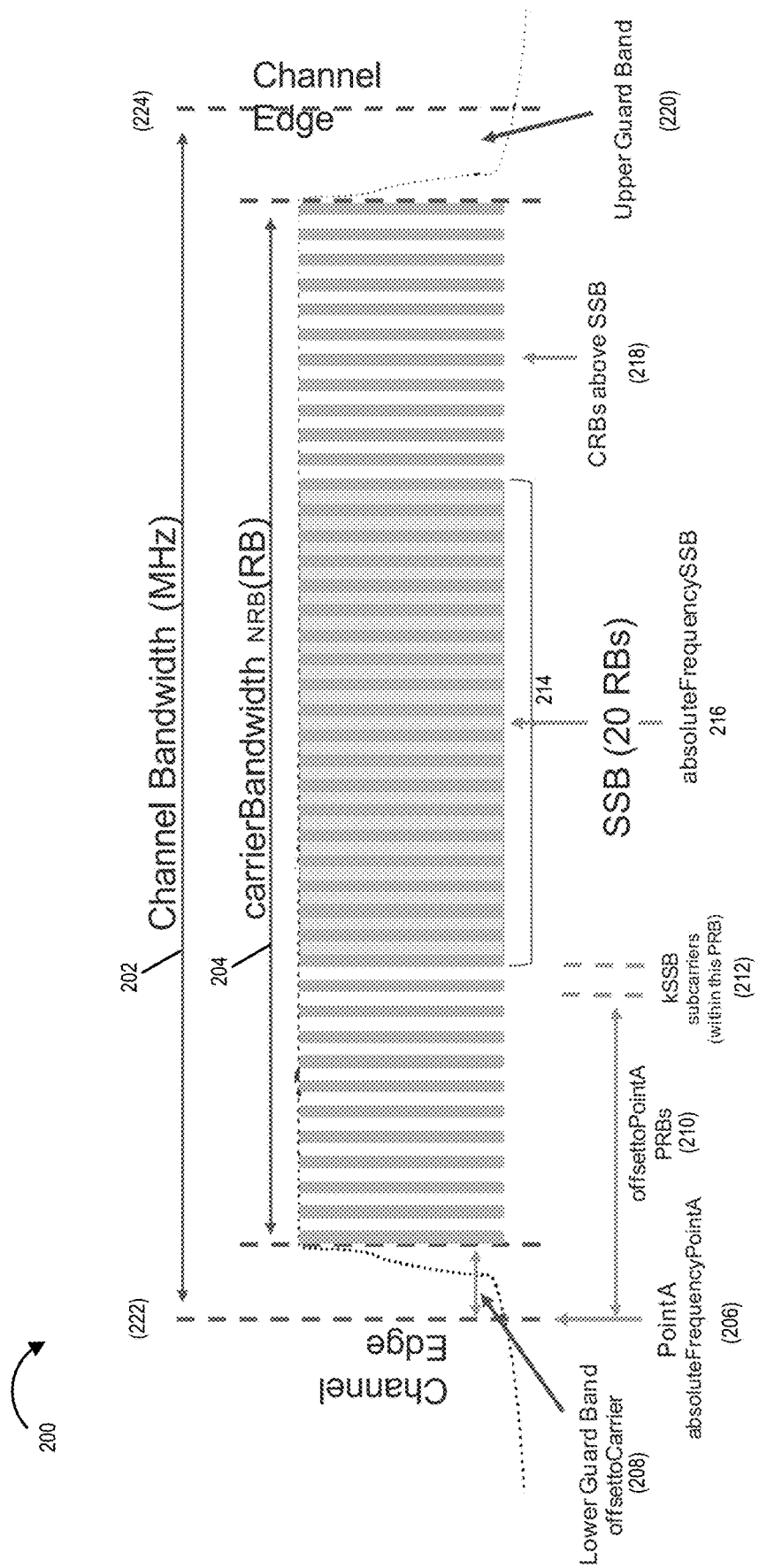
FIG. 2 is a drawing illustrating channel bandwidth including carrier bandwidth conveying a synchronization signal block (SSB) and further illustrating offset information from the channel edge.
Figure 4:
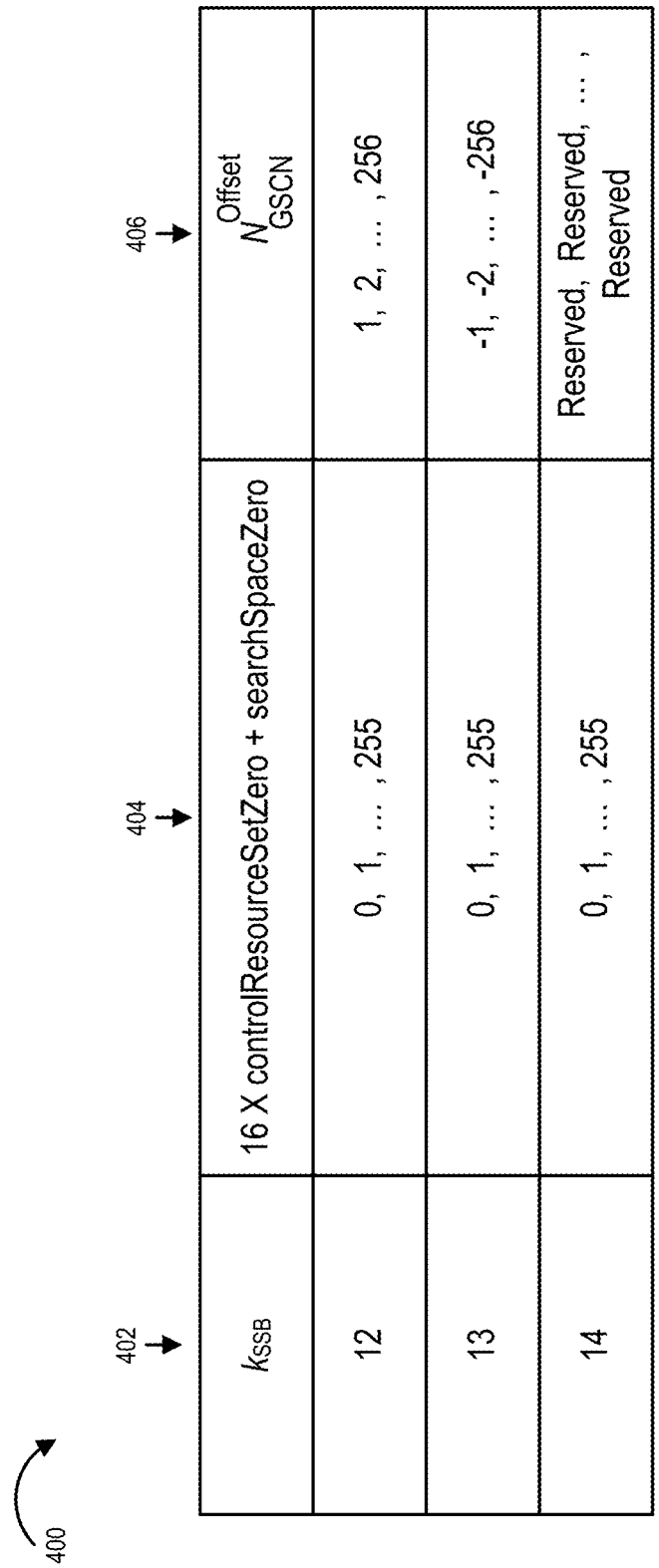
FIG. 4 is a table illustrating a feature of Rel-16, where a SS/PBCH block without Type-0 PDCCH points to a second SS/PBCH on a different Global Synchronization Channel Number (GSCN) point that may have an accompanying Type-0 PDCCH CORESET.
Figure 5:
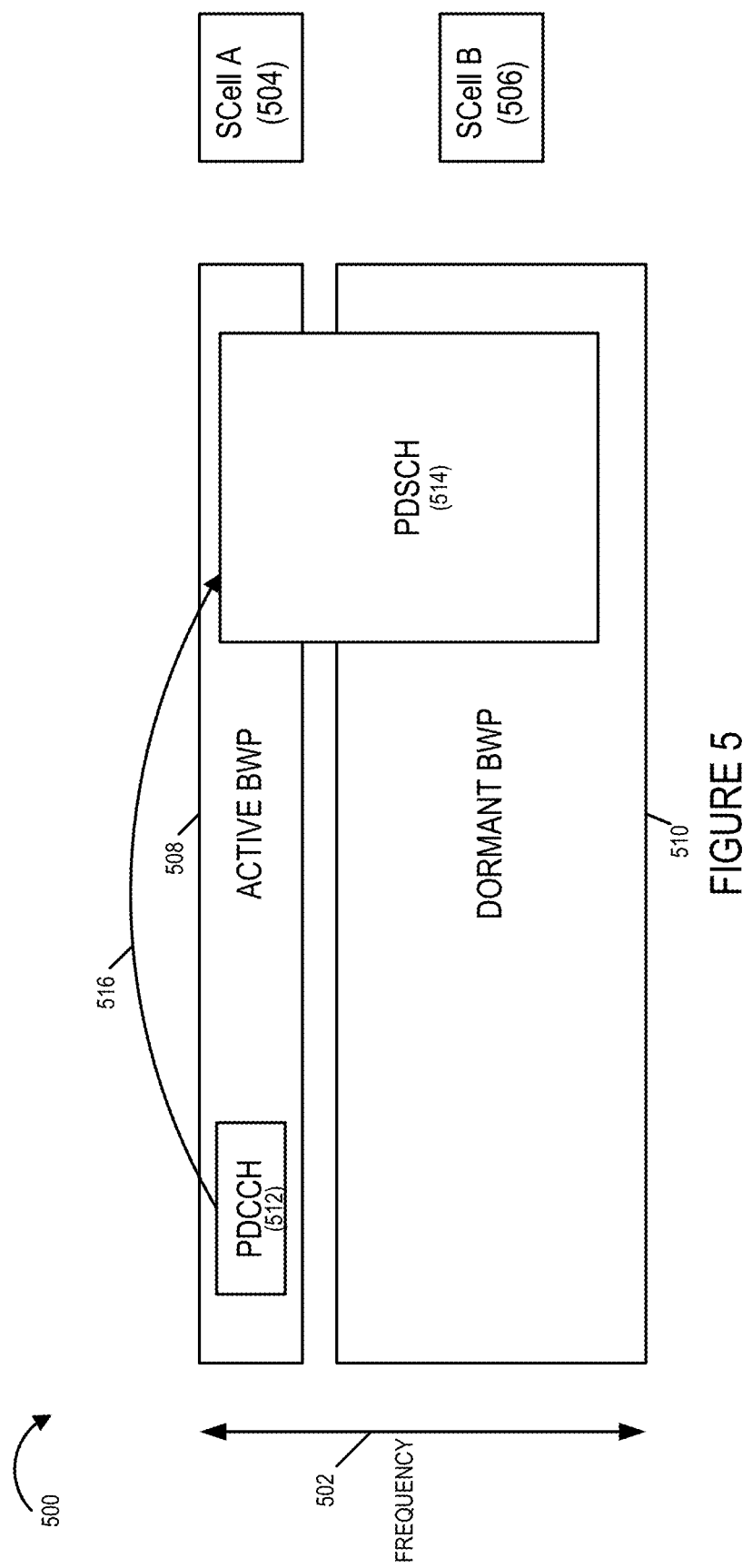
FIG. 5 illustrates a feature in which a PDCCH of an active BWP is used to communicate resource allocations across multiple BWPs in accordance with an exemplary embodiment, one of the BWPs being active with PDCCH monitoring and the other one of the BWPs being dormant without PDCCH monitoring.

FIG. 5 is a drawing 500 illustrating an exemplary active DL BWP 508 corresponding to SCell A 504, and an exemplary dormant DL BWP 510 corresponding to SCell B 506. Bi-directional arrow 502 indicates frequency, and it may be observed that the two BWPs (508, 510) are two frequency-adjacent BWPs. The PDCCH 512 of the active BWP 508 is monitored by the UE and used to convey DCI information including a grant for a single PDSCH 514 which spans resources in both the active BWP 508 and the dormant BWP 510 to the UE.

Drawing 500 shows that DL BWP 508 is a narrowband active DL BWP and DL BWP 510 is a wideband dormant DL BWP, e.g., the UE configuration is for UE power efficiency. The DCI with the multi-BWP scheduling grant for a single Physical Downlink Shared Channel 514 (PDSCH) (one or two TBs) is sent on the active BWP 508, and no PDCCH monitoring is necessary on the dormant BWP 510. Arrow 516 indicates that the multi-BWP grant for the single PDSCH 514 is sent via the PDCCH 512 of the active BWP 508, which is monitored by the UE.

The two BWPs are addressed in DCI Format 1_1 using a combination of existing BWP indicator field for the cell on which PDCCH is received, the existing SCell dormancy indication field, and a new multi-cell flag bit.

The advantages of this embodiment are that the UE can receive or transmit large data packets with reduced latency, since additional Downlink Control Information (DCI) signaling or Radio Resource Control (RRC) reconfiguration is not needed to switch a dormant BWP to active state. UE power efficiency is also improved since the UE does not need to monitor Physical Downlink Control Channel (PDCCH) on the dormant BWP to immediately receive data on it.

Since a dormant BWP can be provided with a Physical Downlink Shared Channel (PDSCH) configuration (but not PDCCH) via BWP-DownlinkCommon and related Information Elements (IEs), and a UE can maintain DL time-frequency synchronization with the aid of Tracking Reference Signal (TRS) transmissions or other DL Reference Signals (RSs), it is feasible for the UE to immediately receive PDSCH on a hitherto dormant BWP. Dedicated PDSCH configuration parameters have to be consistent with the non-dormant BWP/SCell(s) in the allocation.

The changes to the frequency-domain resource allocation (FDRA) in DCI are described next with PDSCH as a non-limiting example. In Rel-16 DCI Format 1_1 for scheduling PDSCH has FDRA field for a single BWP which is set to (see, e.g., 3GPP TS 38.213 V16.2.0, "NR; Physical layer procedures for control (Release 16)," 2020):

(i) NRBG bits if only resource allocation type 0 is configured, where NRBG is defined in Clause 5.1.2.2.1 of [R4-2009245, TS38.214]; or (ii) [log 2 (NDL,BWPRB (NDL,BWPRB+1)/2] bits if only resource allocation type 1 is configured, or (iii) max([log 2 (NDL,BWPRB (NDL,BWPRB+1)/2], NRBG) bits if both resource allocation type 0 and type 1 are configured.

A simple approach for extending the above to multiple BWPs, particularly when they have the same Subcarrier Spacing (SCS), is to treat them as a single logical BWP with contiguous virtual resource blocks. This approach is used in some embodiments of the present invention. This effectively increases (e.g., doubles) the maximum possible value of the NDL,BWPRB compared to Rel-16. If the BWPs have different Sub-carrier Spacings (SCSs), the virtual resource block (VRB) to physical resource block (PRB) is scaled across the BWP border.

Inter-carrier guard band shall be excluded from the resource allocation, while intra-carrier guard band handling is the same as Rel-16. The case of UL resource allocation (with or without interlacing) follows the same principle as PDSCH.

A feature of some exemplary embodiments supports the ability to schedule resource allocations across multiple Bandwidth Parts (BWPs) (typically of a cell group or of a cell) with a single Downlink Control Information (DCI) format via a single Physical Downlink Control Channel (PDCCH) transmission, when applied to uplink transmissions. Immediately switching to an UL transmission on a dormant bandwidth part (BWP) (due to either scheduled UL or configured UL grant) may be challenging if UL transmission time alignment on the scheduled BWPs/cells is not accurate. This is particularly a problem if higher numerologies such as 960 kHz Subcarrier Spacing (SCS) are introduced which shrinks the OFDM symbol duration and renders timing offsets more deleterious as a proportion of the symbol/cyclic prefix (CP) duration.

It is difficult for the gNodeB (gNB) to send a Timing Advance (TA) command for the dormant SCell when it is the sole member of a Timing Advance Group (TAG). This is because the normal procedure of Physical Downlink Control Channel-ordered Physical Random Access Channel (PDCCH-ordered PRACH) transmission (triggered by DCI Format 1_0) from the UE after a period of inactivity that is used by the gNB to computer an appropriate TA is precluded due to BWP dormancy. If Sounding Reference Signal (SRS) transmissions are allowed on a dormant SCell, the existing TA mechanisms can be reused. See, e.g., 3GPP TSG RAN WG4 Meeting #95-e R4-2009245 Electronic meeting, 25 May-5 Jun. 2020, Reply LS to RAN2 on dormant BWP.

Figure 6:
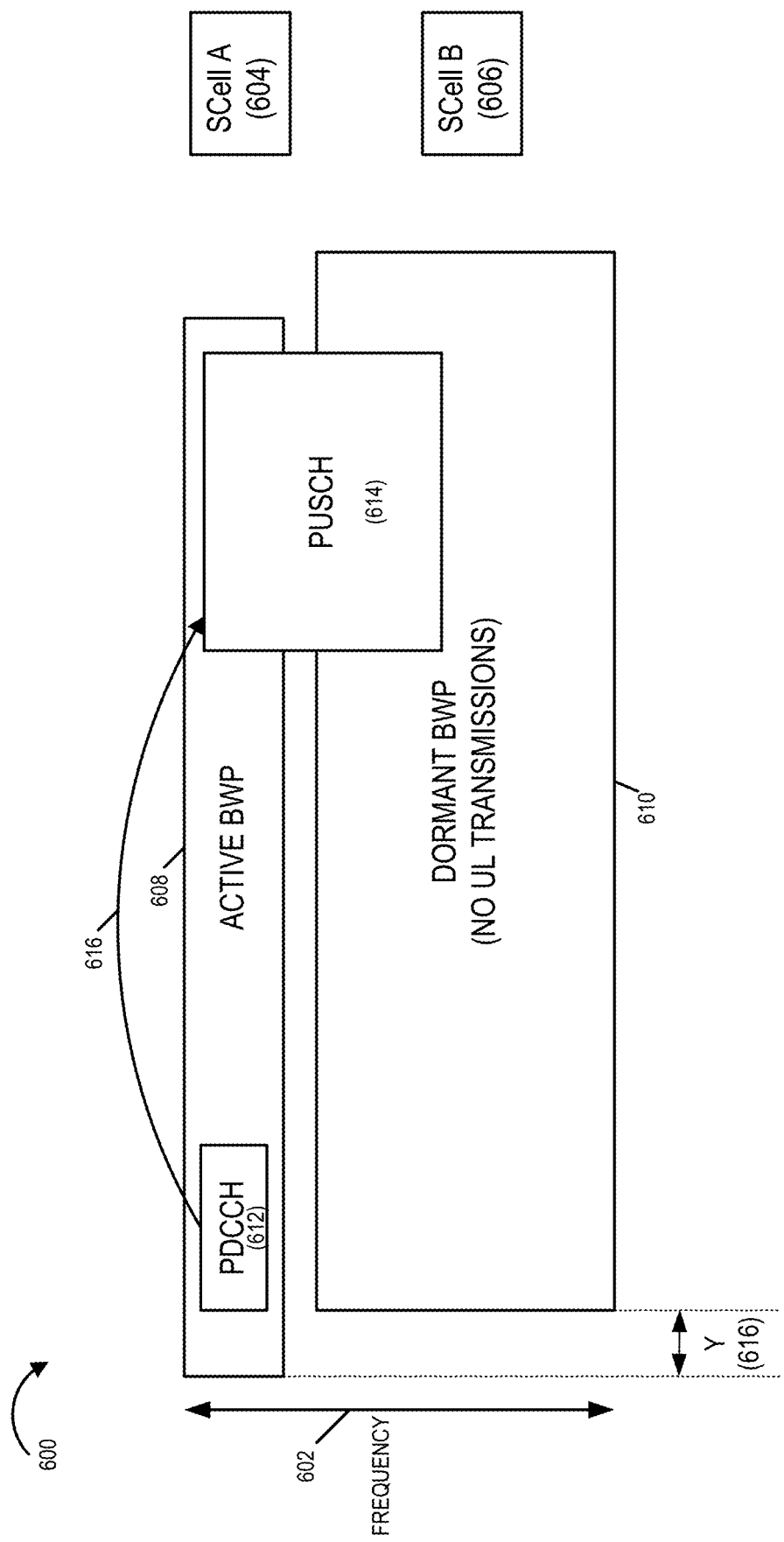
FIG. 6 is used to illustrate that UL timing alignment needs to be taken into consideration when a PDCCH of an active BWP is used to allocate resources for a multi-BWP PUSCH including a dormant BWP.

FIG. 6 is a drawing 600 illustrating an exemplary active BWP 608 corresponding to SCell A 504, and an exemplary dormant BWP 610 corresponding to SCell B 506. Bi-directional arrow 602 indicates frequency, and it may be observed that the two BWPs (608, 610) are two frequency— adjacent BWPs. The PDCCH 612 of the active BWP 608 is monitored by the UE and used to convey DCI information including a grant for a single PUSCH 614 which spans resources in both the active BWP 608 and the dormant BWP 610 to the UE.

Drawing 600 shows that BWP 608 is a narrowband active BWP and BWP 610 is a wideband dormant BWP, e.g., the UE configuration is for UE power efficiency. The DCI with the multi-BWP scheduling grant for a single Physical Uplink Shared Channel 614 (PUSCH) is sent on the active BWP 608, and no PDCCH monitoring is necessary on the dormant BWP 610. Arrow 616 indicates that the multi-BWP grant for the single PUSCH 614 is sent via the PDCCH 612 of the active BWP 608, which is monitored by the UE.

The loss of timing alignment is relevant for a single BWP or multi-BWP scheduling. In the special case of multi-BWP scheduling shown in drawing 600 of FIG. 6, the two UL SCells (SCell A 604, SCell B 606) in FIG. 6 may not be time-aligned, as indicated by timing offset Y 616, between UE and gNB when they are in different Secondary Timing Advance Groups (STAGs).

Two solutions, in accordance with features of some embodiments of the present invention are discussed next. In some embodiments, one of the two described approaches is implemented. In some embodiments, both of the two described approaches are implemented. The first solution is to enhance the existing DCI Format 1_0 used for PDCCH order to includes a SCell dormancy indication field (e.g., up to 5 bits as in DCI Format 1_1). Currently DCI format 1_0 when scrambled with Cell-Radio Network Temporary Identifier (C-RNTI) and the Frequency Domain Resource Assignment (FDRA) field set to all ones is used to trigger UL PRACH transmission by PDDCH order, but carrier indicator or dormancy indication fields are absent.

The addition of a dormancy indication field, which is included in accordance with some embodiments of the present invention, allows the gNB to trigger PRACH on a dormant BWP/SCell for the purpose of TA computation with necessitating PDCCH reception on it. The gNB can, and sometimes does, then send a TA command addressed to the secondary timing advance group (STAG) of SCell B before single-BWP or multi-BWP scheduling.

Figure 7:
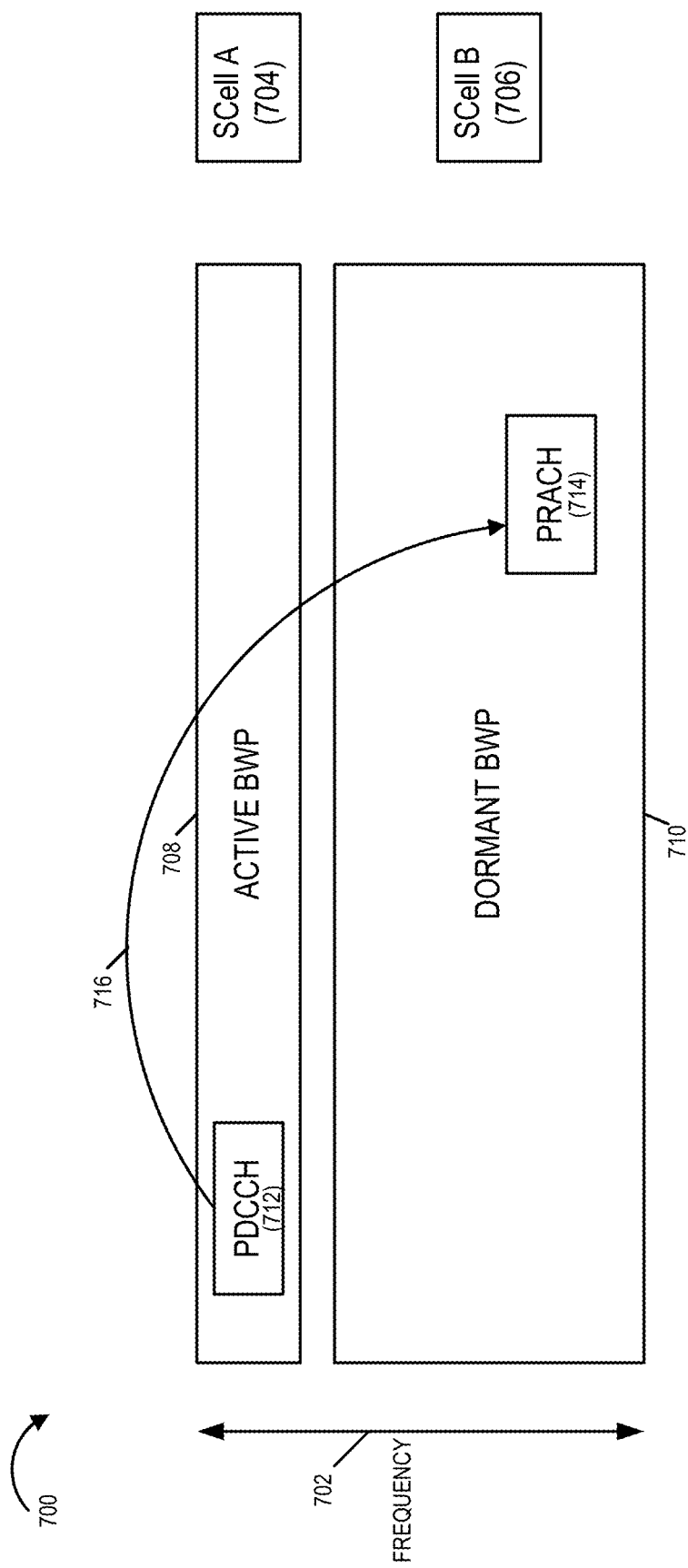
FIG. 7 illustrates one exemplary approach for a UE to obtain Timing Adjustment (TA) information corresponding to a dormant BWP/SCell, the approach including a PDCCH in the active BWP communicating information, e.g. in a SCell dormancy indicator field, to the UE which is used to trigger a PRACH on the dormant BWP/SCell for the purpose of TA computation, in accordance with an exemplary embodiment.

FIG. 7 is a drawing 700 which illustrates the approach of including a novel SCell dormancy indicator field in DCI, and using the SCell dormancy indicator field in DCI (in PDCCH of an active BWP) to trigger PRACH on a dormant BWP/SCell for the purpose of TA computation. Drawing 700 illustrates frequency range 702, an exemplary active BWP 708 corresponding to SCell A 704, and an exemplary dormant BWP 710 corresponding to SCell B 706, wherein the BWPs 708, 708 are adjacent. The PSCCH 712 of the active BWP 712, e.g., using a novel DCI format including a SCell dormancy indicator field, is able to trigger, as indicated by arrow 716, PRACH 714 on the dormant BWP 710.

The second solution is to allow the UE to apply an autonomous timing advance (TA) adjustment for its scheduled UL transmission on the dormant BWP. Assume the UE has up-to-date TA information for SCell A in STAG 1. The UE then derives the appropriate TA for SCell B in STAG 2 based on (i) the instantaneous time offset between SCell A and SCell B (for example derived by UE based on DL measurements), and ii) a new, nominal inter-TAG relative time offset parameter assuming no instantaneous offset that is configured by higher layers.

For example, if the TA for STAG 1 is X µs, the DL relative slot/frame offset between SCell A and SCell B is Y µs, and the nominal inter-TAG time offset configuration is Z µs, the UE computes TA for SCell B as $X'=X-Y-Z$.

Since the main motivation for multiple STAGs at a given time is physically separated UE reception point for each STAG, the nominal inter-TAG time offset Z is a static parameter that does not vary with time.

Figure 8:
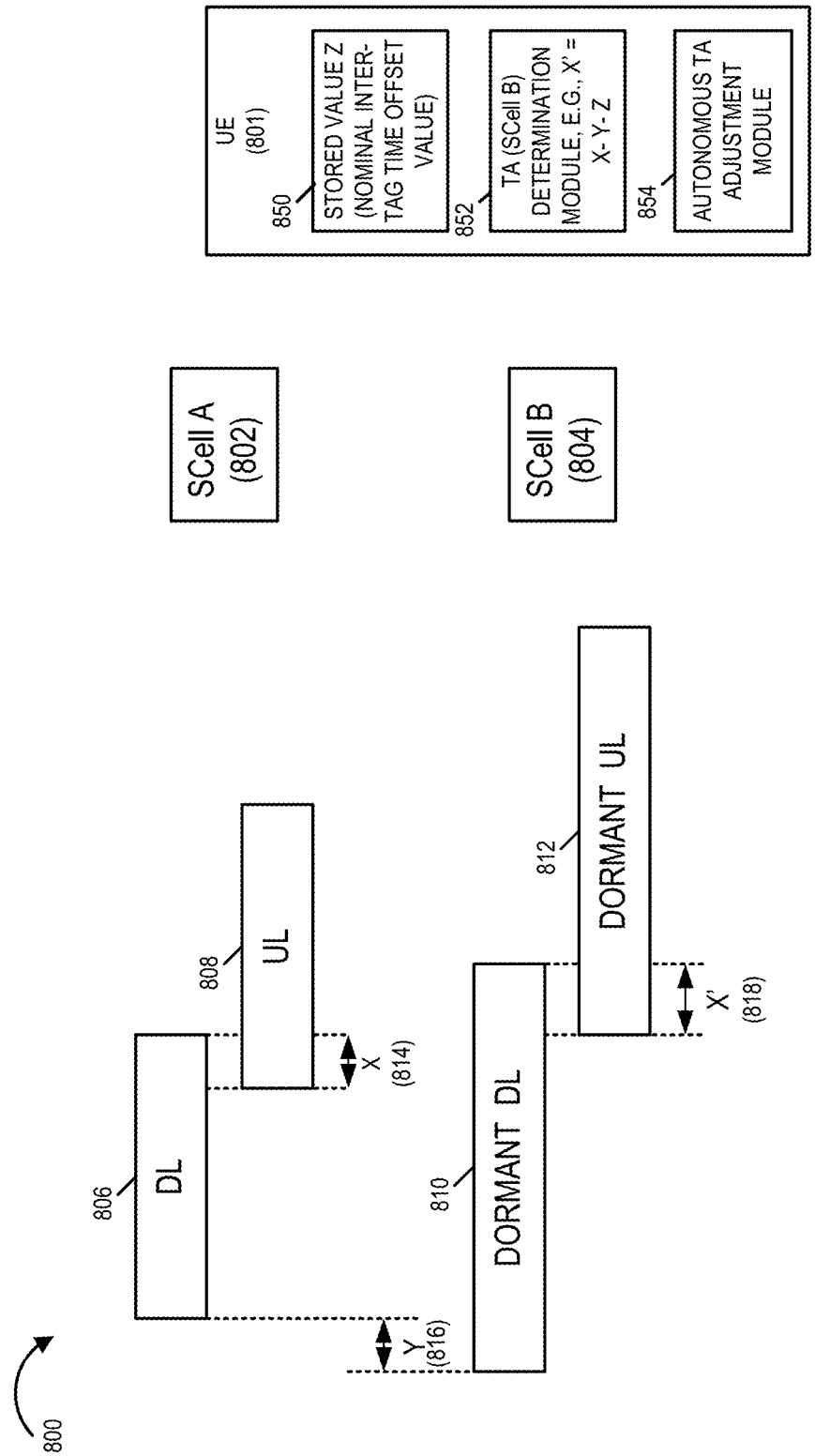
FIG. 8 illustrates another exemplary approach for a UE to obtain Timing Adjustment (TA) information corresponding to dormant BWP/SCell, in which the UE calculates and applies an autonomous TA adjustment based on TA information corresponding to the active SCell, derived instantaneous time offset between the active and dormant SCells, and a new nominal inter-TAG relative time offset parameter, in accordance with an exemplary embodiment.

FIG. 8 is a drawing 800 which illustrates the approach of allowing the UE to apply an autonomous TA adjustment for its scheduled UL transmission on the dormant BWP. Drawing 800 illustrates an active DL 806 and active UL 806 for SCell A 802, a dormant DL 810 and a dormant UL 812 for SCell B 804. X 814 is the TA for STAG 1 corresponding to SCell A 802. Y 816 is the DL relative slot/frame offset between SCell A 802 and SCell B 804, e.g., determined by the UE based on received downlink reference signals from SCell A and SCell B. The nominal inter-TAG time offset configuration, which is known to the UE is Z. The UE computes the TA X' for SCell B, as X'=X−Y−Z.

Drawing 800 shows exemplary UE 801, which includes a stored value Z 850, which is a nominal inter-TAG time offset, a TA determination 852 for determining the TA X' for SCell B, e.g., using the equation X'=X−Y−Z, and an autonomous TA adjustment module for making a timing adjustment in accordance with the UE determined value X'. FIG. 8 shows UE 801 configured with one value Z, corresponding to a nominal inter-tag timing offset value corresponding to SCell A/SCell B, however, UE 801 may be, and generally is, configured with a plurality of different values of Z, corresponding to different pairs of active/dormant SCell combinations which are possible.

Figure 9:
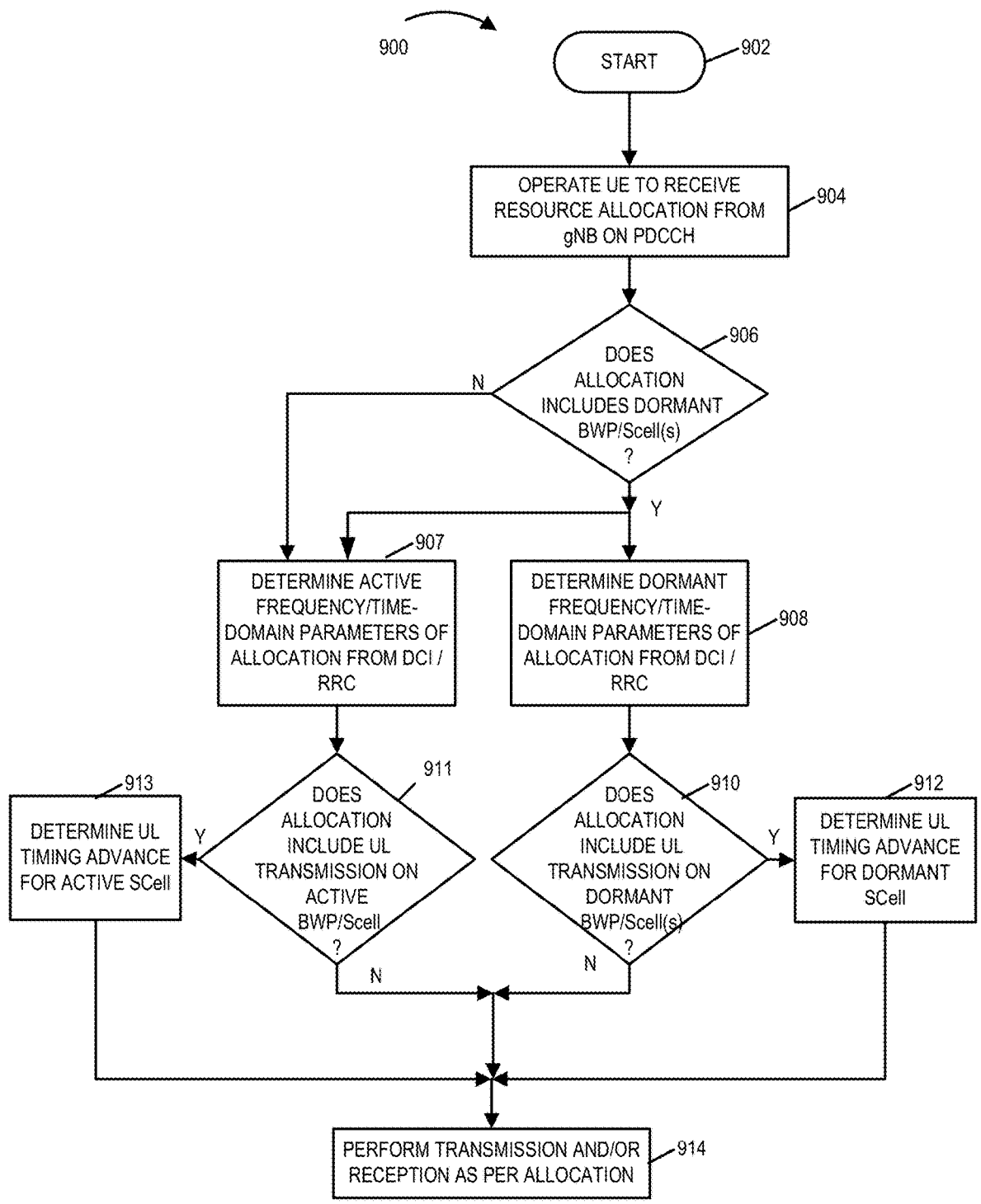
FIG. 9 is a flowchart of an exemplary method of operating a UE device in accordance an exemplary embodiment, said exemplary method including receiving and processing resources allocations communicated on a PDCCH of an active BWP, at least some of said resource allocations being for multi-BWP allocations including an active BWP and a dormant BWP, and said processing including determining TA for a dormant UL BWP.

FIG. 9 is a flowchart of an exemplary method of operating a UE device in accordance with various embodiments. The UE device implementing the method of flowchart 900 configured to implement one or more novel features, e.g., pertaining to carrier aggregation, in accordance with an exemplary embodiment of the present invention, e.g., novel features described with respect to FIGS. 5-8. Operation starts in step 902 and proceeds to step 904. In step 904 the UE receives resource allocation from gNB on PDCCH. The UE may, and sometimes does, receive in step 904, a scheduling grant for a single PDSCH or single PUSCH corresponding to an active BWP but not any dormant BWP(s), which is sent via DCI of the PDCCH of the active BWP. The UE may, and sometimes does, receive in step 904, a multi-BWP scheduling grant for a single PDSCH corresponding to an active BWP and a dormant BWP, which is sent via DCI of the PDCCH of the active BWP. The UE may, and sometimes does, receive in step 904, a multi-BWP scheduling grant for a single PUSCH corresponding to an active BWP and a dormant BWP, which is sent via DCI of the PDCCH of the active BWP. In some embodiments both the active BWP and the dormant BWP correspond to SCells. In various embodiments, the DCI format of the PDCCH of the active BWP, used to communicate the multi-BWP scheduling grant, includes a novel multi-cell flag bit in addition to an SCell dormancy indication field. In some embodiments, multiple BWPs are treated as a single logical BWP with contiguous virtual resource blocks, e.g. with regard to frequency-domain resource allocation (FDRA) in DCI, e.g., particularly when the multiple BWPs have the same SCS. In some embodiments, if the BWPs have different SCSs, the virtual resource block (VRB) to physical resource block (PRB) mapping is scaled across the BWP. In some embodiments, inter-carrier guard band are excluded from the resource allocation. Operation proceeds from step 904 to step 906.

In step 906 the UE determines if the allocation includes dormant BWP/SCell(s). If the determination is that the allocation does not include dormant BWP/SCell(s), then operation proceeds to step 907, in which the UE determines active frequency/time-domain parameters of the allocation from Downlink Control Information/Radio Resource Control (DCI/RRC). Operation proceeds from step 907 to step 911, in which the UE determines if the allocation include UL transmission on active BWP/SCell. If the determination of step 911 is that the allocation includes UL transmission on active BWP/SCell, then operation proceeds from step 911 to step 913, in which the UE determines UL timing advance for the active SCell, e.g., based on received timing advance commands, e.g., absolute and/or relative TA commands, received from the base station of the active SCell. Operation proceeds from step 913 to step 914. Returning to step 911, if the determination of step 911 is that the allocation does not include UL transmission on active BWP/SCell, then operation proceeds from step 911 to step 914.

Retuning to step 906, if the UE determines in step 906, that the allocation includes dormant BWP/SCell(s), then operation proceeds from step 906 to step 907 and step 908. The operations from step 907 have been previously described and will not be described again. In step 908 the UE determines dormant frequency/time-domain parameters of the allocation from Downlink Control Information/Radio Resource Control (DCI/RRC). Thus the UE is able to determine dormant frequency/time-domain parameters of the allocation from the DCI information communicated via the PDCCH of the active BWP without having to monitor PDCCH of the dormant BWP. Operation proceeds from step 908 to step 910.

In step 910 the UE determines if the allocation includes UL transmission on dormant BWP/SCell(s). If the determination is that the allocation does not include UL transmission on dormant BWP/SCell(s), then operation proceeds from step 910 to step 914.

However, if the UE determination is that the allocation does include UL transmission on dormant BWP/SCell(s), then operation proceeds from step 910 to step 912, in which the UE determines UL timing advance for dormant SCell. In some embodiments, the UL timing advance for the dormant SCell is determined based on timing advance information received in response to a PRACH by the UE in the dormant BWP, which was triggered from via a received DCI signal communicated in the PDCCH of the active BWP, e.g., as described and/or shown with respect to FIG. 6. In some such embodiments, the DCI format used by the PDCCH includes a SCell dormancy indicator field that allows the gNB to trigger PRACH on a dormant BWP/SCell for the purpose of TA computation. In some embodiments, the UL timing advance for the dormant SCell is determined based on an autonomous TA adjustment determination for its scheduled UL transmission on the dormant BWP as described and/or shown with respect to FIG. 7. For example, the UE determines the autonomous TA adjustment value for dormant SCell based on the instantaneous time offset between the active and dormant SCells, e.g. derived from UE DL measurements, and a new nominal inter-TAG relative time offset parameter. Operation proceeds from step 912 to step 914.

In step 914, the UE performs transmission and/or reception as per allocation, e.g., determined in steps 908, 907, and in accordance with determined timing advance determinations of steps 912, 913.

Another exemplary feature, included in some embodiments, of the present invention is an added additional set of DL transmissions that a UE may expect to receive on a dormant BWP or dormant NR carrier. In various embodiments, the UE monitors for and receives the additional set of downlink transmission in a dormant BWP or dormant NR carrier and makes use of the communicated information. The additional set of transmissions is Synchronization Signal/ Physical Broadcast Channel (SS/PBCH) blocks, e.g., SS/PBCH blocks without Remaining Minimum System Information/System Information Block #1 (RMSI/SIB1) (on PDSCH) scheduled via a Type-0 PDCCH search space. This has the following benefits.

For RRC_Connected UEs configured with dormant BWP, the SS/PBCH blocks provide additional time-frequency tracking, beam management and Channel Status Information (CSI) estimation opportunities.

For UEs not configured with this dormant BWP/SCell, the SS/PBCH blocks enable mobility measurements such as Reference Signal Received Power/Reference Signal Received Quality (RSRP/RSRQ).

Figure 10:
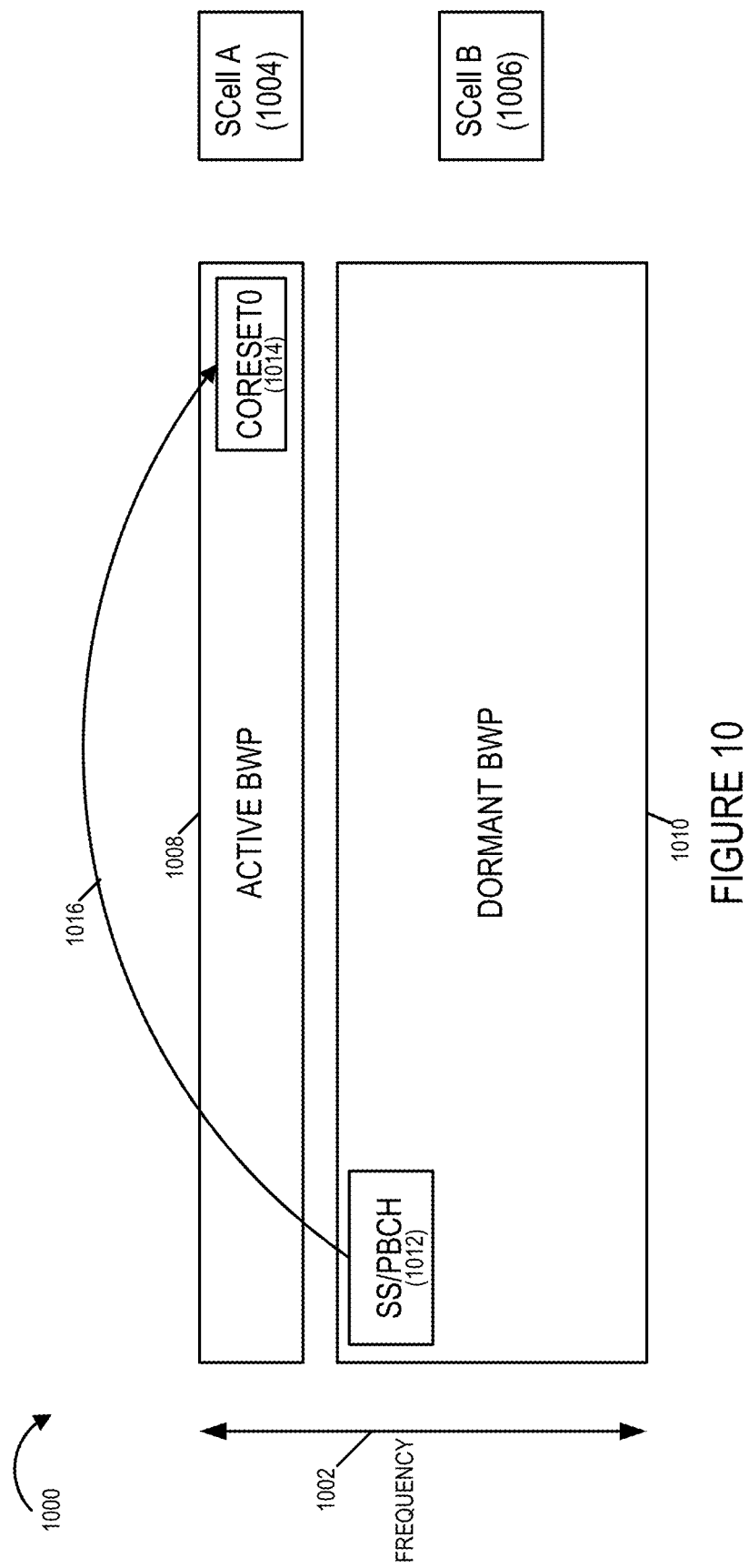
FIG. 10 is a drawing illustrating an exemplary feature, of some embodiments, in which a SS/PBCH block of a dormant BWP is broadcast and is used by monitoring UEs, to determine where a set of core information is located in the frequency spectrum with regard to an active BWP, said active BW portion corresponding to a different cell and different carrier than the dormant BW portion.

For idle UEs seeking to perform initial access, the gNB can point them to a cell with Remaining Minimum System Information/Core Set 0 (RMSI/CORESET0) by indicating a inter-cell RB offset in frequency and slot offset in time via pdcch-ConfigSIB1 in the Master Information Block (MIB) of the SS/PBCH block, as shown in FIG. 10.

FIG. 10 is a drawing 1000 illustrating an exemplary active BWP 1008, a dormant BWP 1010, and frequency axis 1002. The active BWP 1008 is adjacent the dormant BWP 1010. The active BWP 1008 corresponds to SCell A 1004, while the dormant BWP 1010 corresponds to SCell B 1006. The UE monitors the dormant BWP 1010 for SS/PBCH blocks 1012, receives the SS/PBCH blocks 1012 and recovers information communicated in the SS/PBCH blocks 1012 of the dormant BWP 1010. An inter-cell RB offset in frequency and slot offset in time via pdcch-ConfigSIB1 in the Master Information Block (MIB) of the SS/PBCH block 1012 is part of the information that is communicated. This offset information identifies the CORESET0 1014 of information included in active BWP 1008, as indicated by arrow 1016.

The inter-cell RB offset between the smallest RB index of the CORESET for Type 0-PDCCH Common Search Space (CSS) on cell A and the smallest RB index of the common RB overlapping with the first RB of the SS/PBCH block on the dormant cell B can be, and in some embodiments, is signaled using one of the reserved resources for an existing SS/PBCH+CORESET0 Subcarrier Spacing (SCS) combination from Rel-16, or using a new SS/PBCH+CORESET0 SCS combination if defined in Rel-17.

If the gNB wants to preclude initial access via the dormant cell, said SS/PBCH blocks can be transmitted outside of the synchronization raster points.

This featured is different from the current feature in Rel-16, where a SS/PBCH block without Type-0 PDCCH points to a second SS/PBCH on a different Global Synchronization Channel Number (GSCN) point that may have an accompanying Type-0 PDCCH CORESET (see). The proposed feature, in accordance with the present invention, points directly to a Type-0 PDCCH on a different cell.

It is further noted that dormancy configuration is UE-specific and the same carrier may configured dormancy for one set of UEs and CORESET0/PDCCH monitoring for another set of UEs. However, a gNB may operate a cell in dormant mode for all UEs for either network-side power saving or ultra-lean, low overhead operation for interference mitigation.

FIG. 11 is an exemplary table 1100 corresponding to SS/PBCH information communicated in accordance with an exemplary embodiment. First column 1102 includes index information; second column 1104 indicates SS/PBCH block and CORESET0 multiplexing pattern information; third column 1106 indicates number of resource blocks (RBs); fourth column 1108 indicates number of symbols; and first column 1110 indicates offset in RBs.

An example is shown in table 1100 of FIG. 11, where Index 8, in which one of the previously Rel-16 reserved rows (See FIG. 3), for pdcch-ConfigSIB1 with SS/PBCH block SCS of 240 kHz and Type-0 PDCCH CORESET SCS of 120 kHz, is now being used, in accordance with a feature of some embodiments, of the present invention, to signal inter-cell RB offset of 283 RBs following the SCS of the detected SS/PBCH block (See the table element corresponding to row 1112 and column 1110 of table 1100 of FIG. 11. At the same time, the kSSB parameter is set to a value greater than 11 to indicate a Type-0 PDCCH search space is not present along with the SS/PBCH block of the dormant carrier.

Figure 12:
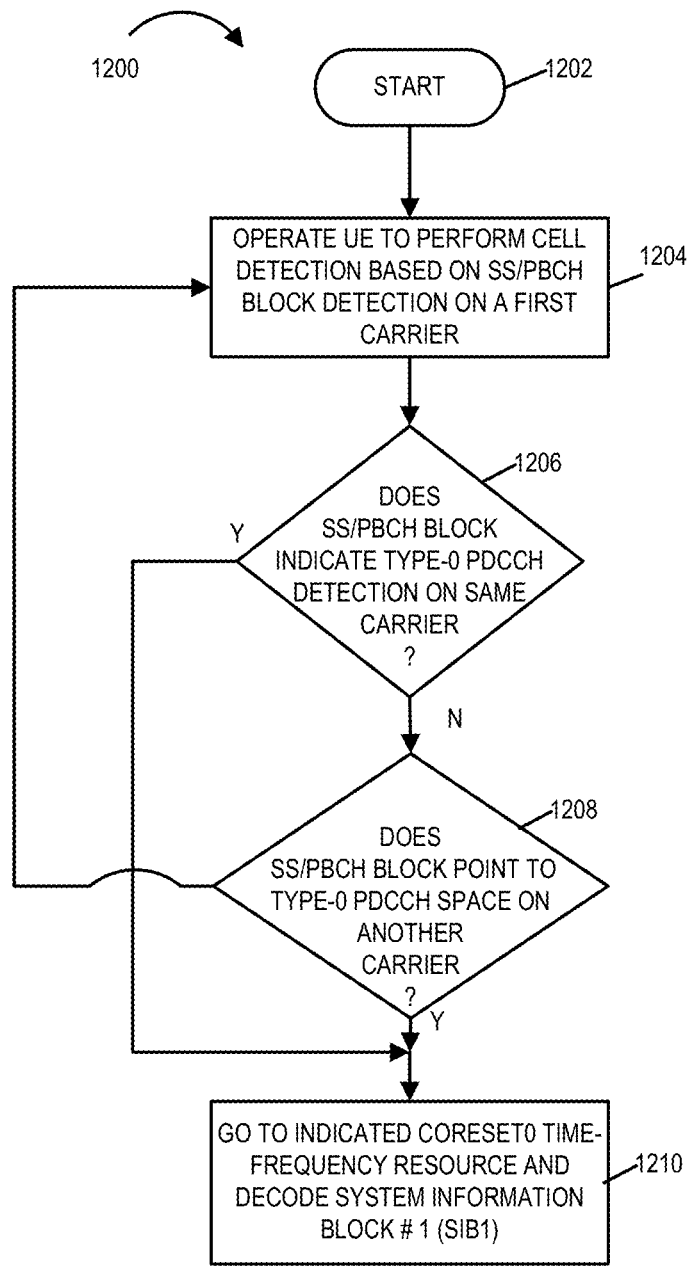
FIG. 12 is a flowchart of an exemplary method of operating a UE in accordance with an exemplary embodiment, the exemplary method including operating the UE to perform cell detection based on SS/PBCH block detection on a first carrier, e.g. a carrier of a dormant SCell.

FIG. 12 is a flowchart 1200 of an exemplary method of operating a UE in accordance with an exemplary embodiment. Operation starts in step 1202, in which the UE is powered on and initialized and proceeds to step 1204. In step 1204 the UE performs cell detection based on SS/PBCH block detection on a first carrier. Operation proceeds from step 1204 to step 1206.

In step 1206 the UE determines if the SS/PBCH block indicates Type-0 PDCCH search space on the same carrier. If the UE determines that the SS/PBCH block indicates Type-0 PDCCH search space on the same carrier, then operation proceeds from step 1206 to step 1210, in which the UE goes to the indicated CORESET0 time-frequency resource and decodes System Information Block #1 (SIB1).

Returning to step 1206, in step 1206, if the UE determines that the SS/PBCH block does not indicate Type-0 PDCCH search space on the same carrier, then operation proceeds from step 1206 to step 1208. In step 1208 the UE determines whether or not the SS/PBCH block points to a Type-0 PDCCH space on another carrier. If the SS/PBCH block does not point to a Type-0 PDCCH space on another carrier, then operation proceeds from step 1208 to the step 1204. However, if the SS/PBCH block does point to a Type-0 PDCCH space on another carrier, then operation proceeds from step 1208 to the step 1210, in which the UE goes to the indicated CORESET0 time-frequency resource and decodes the S1B1.

In one example, the first carrier is a carrier corresponds to a dormant BWP and the another carrier corresponds to a active BWP.

Figure 13:
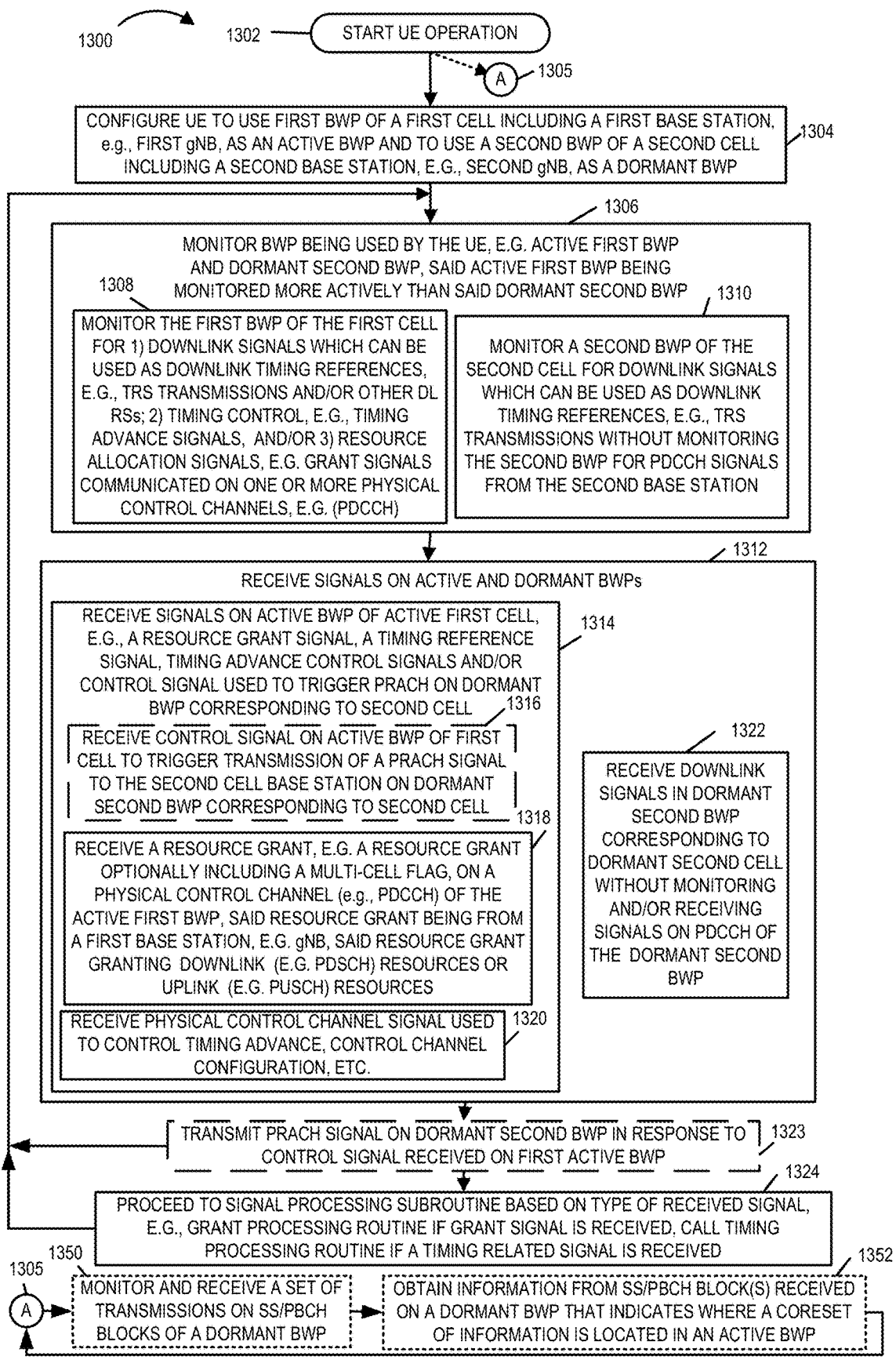
FIG. 13 illustrates an exemplary method of operating a UE in accordance with one exemplary embodiment in which multi-cell grants are supported which allow a UE device to be granted resources corresponding to an active bandwidth part and a dormant bandwidth part.

FIG. 13 illustrates a method 1300 of operating a user equipment device (UE), e.g., a cell phone or other communications device that receives and/or sends signals to one or more base stations, e.g., gNBs. The method 1300 begins in start step 1302 with the UE being powered on and beginning operation under the control of the processor included in the UE.

Operation proceeds from start step 1302 to step 1304 in which the UE is configured for communication purposes. In step 1304 the UE is configured to use a first bandwidth portion (BWP) of a first cell (e.g., first S Cell A) in which a first base station (gNB) is located as a active bandwidth portion and to use a second bandwidth portion of a second cell (e.g., 2nd SCell B) including a second base station (gNB) as a dormant bandwidth portion. Thus, at the end of step 1304, the UE is configured to use the first BWP corresponding to the first cell as an active bandwidth portion and the second bandwidth portion corresponding to the second cell as a dormant bandwidth portion.

Operation proceeds from step 1304 to step 1306 in which the UE monitors the BW portions being used with the first active BWP corresponding to the first cell being monitored more actively than the dormant second BWP. For example, in some embodiments the PDCCH of the dormant second BWP is not monitored while the PDCCH of the first active BWP is monitored. Monitoring of broadcast signals used as timing references may occur in some cases on the second BWP even when the PDCCH of the second BWP is not being monitored.

Monitoring step 1306 includes in some embodiments step 1308. In step 1308 the UE monitors the first BWP of the first cell for i) downlink signals which can be used as downlink timing references. In some embodiments such signals are Tracking Reference Signal (TRS) transmissions and/or other downlink reference signals (DL RS). In addition to the timing reference signals in step 1308 the UE also monitors for timing advance signals used to control timing advance when the UE transmits to the first base station in the first cell and resource allocation signals also referred to as grant signals. In various embodiments the grant signals are communicated on a Physical Control Channel, e.g., physical downlink or uplink control channel, of the first BWP which is monitored in step 1308. Step 1306 also includes in some embodiments step 1310 which relates to monitoring of the dormant second BWP corresponding to the second cell. In step 1310 the UE monitors the second BWP of the second cell for downlink signals which can be used as timing references, e.g., for TRS transmission, without monitoring the second BWP for PDCCH signals from the second base station. Thus the dormant second BWP is subject to a much lower level of monitoring than the active BWP with the PDCCH of the second BWP being left unmonitored while the second BWP is treated as a dormant BWP.

Operation proceeds from monitoring step 1306 to receive signal step 1312 in which various signals are received on the active and dormant BWPs being used by the UE. Step 1312 includes step 1314 which involves receiving signals on the first BWP of the active cell and step 1322 which relates to receiving signals on the dormant second BWP corresponding to the second cell.

In step 1314 signals are received by the UE on the active first BWP corresponding to the active first cell. Signals which are received in step 1314 on the first BWP include a resource grant signal, a timing reference signal, timing advance control signals and/or a control signal used to trigger a PRACH signal being transmitted on the second dormant BWP corresponding to the second cell. Receipt of the PRACH control signal is optional and implemented, in some but not all embodiments. In optional step 1316 the UE receives a control signal, e.g., command, to transmit a Physical Random Access Channel (PRACH) signal on the second BWP which can then be measured by the second base station and used to generate a timing control signal that can be communicated to the UE and used by the UE to control timing advance and/or other uplink timing when the UE transmits to the second cell. Thus, the methods of the invention allow a UE to be controlled to transmit a PRACH in a dormant BWP via a signal transmitted in a different, e.g., active, BWP. The initiation of PRACH signal transmission on the second BWP via the first BWP, e.g., prior to a grant of resources corresponding to the second BWP, provides a mechanism by which uplink timing information can be determined and uplink transmission timing of the UE with regard to the second BWP can be controlled. The control signal used to trigger PRACH transmission is optional and thus step 1316 is shown using dashed lines to indicate that receiving the PRACH transmission control signal is an optional step which is performed in some but not necessarily all embodiments.

In step 1318 the UE receives on the first BWP a resource grant that optionally includes a multi-cell flag in accordance with some embodiments which, when set to a first value such as one, indicates that the grant is for both the active first BWP and the second BWP, which corresponds to the dormant cell. The multi-cell resource grant signal is communicated in some embodiments on the PDCCH channel of the first BWP. The resource grant when used as a multi-cell grant can, and sometimes does, grant the UE the right to use resources in both the active first BWP and the dormant second BWP without requiring the UE to receive a separate grant on the second BWP to use the dormant BWP. The multi-cell grant of the present invention can, and sometimes does, reduce latency since it reduces the number of grant and/or other signals which have to be transmitted before a UE can use resources in both the active and dormant BWPs.

In step 1320 the UE received a physical control channel signal on the first BWP which provides a timing advance command used to control UE uplink timing advance when transmitting uplink signals using the first BWP. In some embodiments timing advance signals are not sent on the second BWP and the UE derives the timing advance to be used when transmitting uplink signals on second BWP resources granted by a multi-cell grant from the timing used in the first cell even though the second cell corresponds to a second timing advance group in at least some embodiments. Determining uplink timing to be used with resources of a dormant cell will be discussed further with regard to the routine shown in FIG. 15.

Receipt of signals on the dormant second BWP corresponding to the second cell occurs in step 1322. In step 1322 the UE receives downlink signals corresponding to the dormant second cell without monitoring and/or receiving signals on the PDCCH of the dormant second BWP. Thus while broadcast timing reference signals and other broadcast signals may be, and sometimes are, received and processed in step 1322 the second BWP is not monitored and the UE need not spend energy or processing resources to recover PDCCH signals for the dormant BWP and closed loop control of timing advance need not be performed on an ongoing basis for the dormant second BWP. Despite this uplink grants can be received on the active BWP conveying the right to use the second BWP for uplink and uplink timing advance can be promptly determined as will be discussed below allowing for rapid use of the dormant second BWP for uplink purposes.

Operation proceeds from receive step 1312 to optional step 1323 when a control signal to transmit a PRACH on the second BWP is received. Optional step 1323 is used in embodiments where PRACH transmissions on the second BWP are initiated on the first BWP. The PRACH transmission control signal is normally transmitted sufficiently before an uplink grant involving granting of resources on the second dormant BWP to allow for a second base station measurement of the transmitted PRACH signal and communication of uplink timing information to the UE for use in controlling timing advance used for transmissions on BWPs corresponding to the second cell.

In step 1323 the UE transmits a PRACH signal in response to the control signal received on the first BWP which is used to trigger the transmission on the dormant second BWP. The received control signal used to trigger the PRACH transmission indicates the BWP and/or cell on which the PRACH transmission is to occur and by identifying the second BWP or second cell the control signal received on the first BWP triggers the transmission to the second base station which is in the second cell. Operation is shown proceeding from step 1323 back to monitoring step 1306 to show that signal monitoring, receipt and processing of signals occurs on an ongoing basis.

Operation proceeds from step 1312 to step 1324 for processing of signals other than the PRACH transmit control signal used to trigger transmission of the PRACH signal on the second BWP. In step 1324 the UE proceeds to call a signal processing subroutine corresponding to the type of signal received. After calling the signal processing subroutine corresponding to the received signal type operation returns to monitoring step 1306 so that signals can be monitored, received and processed on an ongoing basis.

In some embodiments, the exemplary method of flowchart 1300 includes optional steps 1350 and 1352. Operation proceeds from start step 1302, via connecting node A 1305 to step 1350. In step 1350, the UE monitors for and receives a set of transmissions on SS/PBCH blocks of a dormant BWP. Operation proceeds from step 1350 to step 1352. In step 1352 the UE obtains information from SS/PBCH block(s) received on the dormant BWP that indicates where a CORESET of information is located in an active BWP. In some embodiments, the obtained information from SS/PBCH block(s) received on the dormant BWP includes an inter-cell resource block offset.

Figure 14:
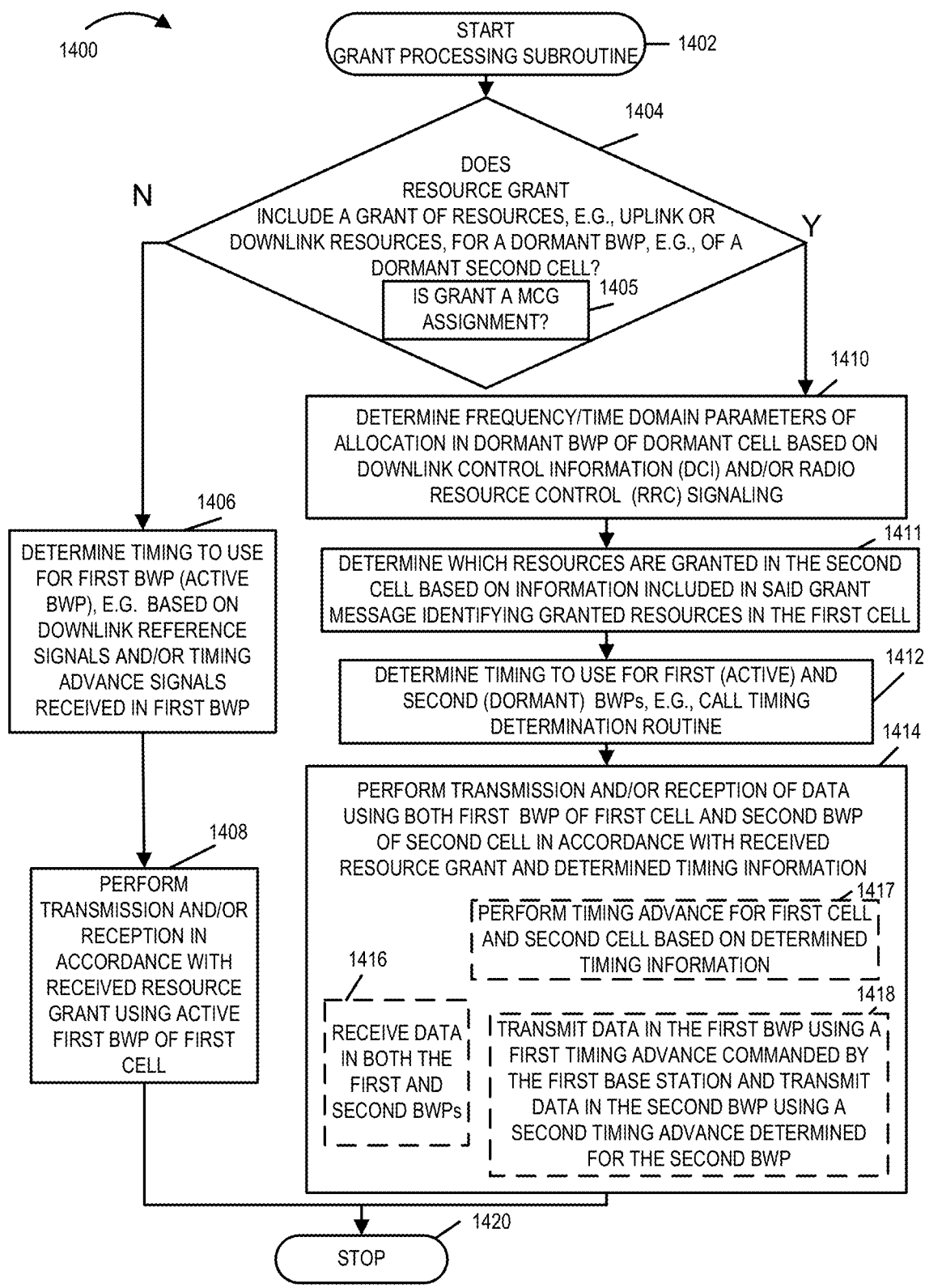
FIG. 14 illustrates an exemplary UE grant processing subroutine that is used in some embodiments.

An exemplary grant processing routine 1400 is shown in FIG. 14. The exemplary grant processing routine 1400 is called from step 1324, when a grant signal, e.g., an uplink or downlink grant signal, is received. The grant signal in some embodiments is a multi-cell grant signal which can, and sometimes does, allocate resources to a UE that correspond to multiple cells, e.g., an active cell and a dormant cell. A multi-cell grant is indicated in some embodiments by setting a multi-cell flag in a grant signal sent on an active BWP to a first value, e.g., a 1, and to a second value, e.g., 0 to indicate the grant is not a multi-cell grant. Alternatively, the multi-cell flag can be omitted in the case of a single cell grant.

The grant processing routine 1400 starts in step 1402 when the routine is called to process a received grant, e.g., allocation of uplink or downlink resources, to the UE communicated to the UE, e.g., in the first active BWP corresponding to the first cell.

Operation proceeds from start step 1402 to check step 1404 in which the resource grant is checked to determine if it includes a grant of resources for a dormant BWP corresponding to a dormant cell. In some embodiments this check involves step 1405 in which a grant is checked to determine if it is a multi-cell grant (MCG), e.g., a grant relating to an active and dormant cell as indicated by a multi-cell flag being set to a first value, e.g., 1, in the grant message. In the case of a multi-cell grant message with information relating to a dormant BWP, operation will proceed from step 1404 to step 1410. If in step 1404 it is determined that the grant is not for a dormant BWP, e.g., the grant grants resource for the first active BWP of the first cell and no resources for the second dormant BWP, operation proceeds from step 1404 to step 1406.

In step 1406 the timing to use for the first BWP which is the active BWP to which the grant relates is determined based on signals received in the active first BWP. This is the same BWP in which the grant being processed was received. In some embodiments step 1406 involves using downlink signals received on the first BWP to determine downlink signal timing and/or timing control signals, e.g., one or more timing advance signals, received on the first BWP to determine uplink timing to be used for uplink transmission on the first BWP. Operation proceeds from step 1406 to step 1408 wherein transmission or reception is performed in accordance with the received grant of resources corresponding to the first cell and the active BWP.

Operation proceeds from step 1408, in which the granted resources in the active BWP are used, to stop step 1420 pending a call to the routine 1400 to perform processing relating to another received grant.

If in step 1404 it was determined that the received grant message included a grant of resources corresponding to a dormant BWP, e.g., the second BWP as would be the case of a multi-cell grant which grants resources for the active and dormant cells, operation proceeds from step 1404 to step 1410.

In step 1410 frequency and/or time domain parameters relating to the allocated resources in the dormant BWP of the dormant cell, e.g., second cell, are determined based on downlink control information (DCI) and/or radio resource control signaling. In some embodiments the second BWP is assumed to have the same structure as the first BWP for which information is known from the signaling received in the first BWP.

Operation proceeds from step 1410 to step 1411 in which the resources which are granted in the second cell are determined. The granted resources in the first cell are known to the UE from the grant and/or control channel (PDCCH) information communicated to the UE. In some but not all embodiments, a multi-cell grant which grants resources in the first active BWP also allocates the corresponding time/frequency resources in the second corresponding to a dormant cell. e.g., an adjacent, BWP. In some such embodiments in step 1411 the resources granted in the second BWP are determined based on information of the resources granted in the first part and a fixed or known relationship between resources granted in the second part relative to the resources granted in the first part.

Figure 15:
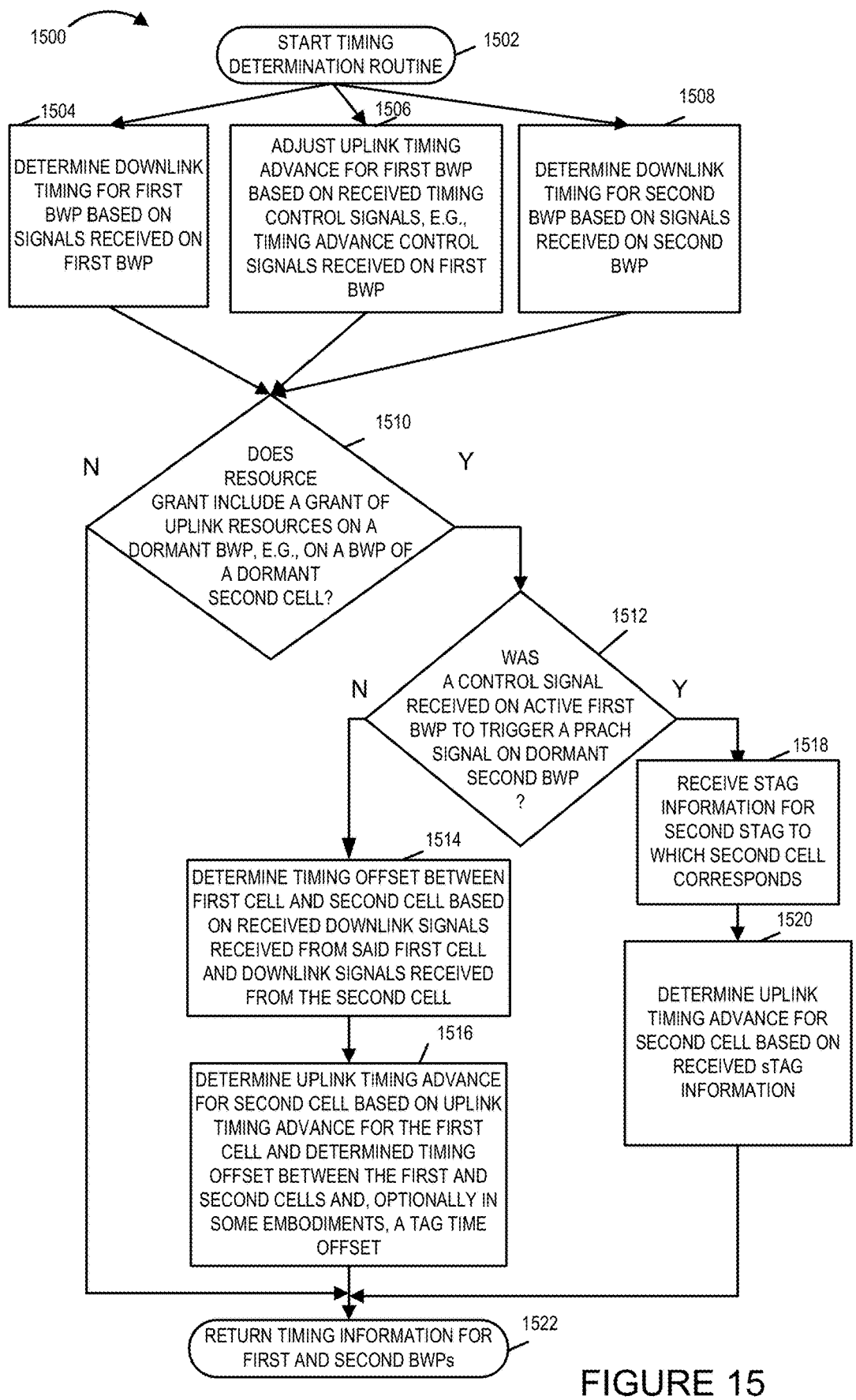
FIG. 15 illustrates an exemplary UE timing determination routine implemented in accordance with one exemplary embodiment.

With the resources to be used in the first and second BWPs known by the end of step 1411 operation proceeds to step 1412 in which timing to use for the first, e.g., active, BWP and the second (e.g., dormant) BWP is determined, e.g., by calling timing determination subroutine 1500 shown in FIG. 15. The timing determination subroutine 1500 determines and returns the timing information to be used by the UE to receive data in the downlink of the first and second BWPs in the case of a downlink resource grant and/or determines and returns timing information, e.g. the timing advances, to be used in the first and second cells, respectively, in the case of a multi-cell uplink grant.

Operation proceeds from step 1410 to step 1411 in which the timing information determined in step 1414 is used. In step 1414 the UE performs transmission and/or reception of data using both the first BWP of the first cell and the second BWP of the second cell in accordance with the received resource grant and determined timing information.

Step 1414 includes, in some embodiments, receive step 1416 which is implemented in the case of a multi-cell downlink grant. In step 1414 the UE receives data in both the first (active) and second (dormant) BWPs in accordance with the determined first and second cell downlink timing information.

In the case of a multi-cell uplink grant involving a grant corresponding to an active BWP and a dormant BWP, step 1414 includes both steps 1417 and step 1418. In step 1417 the UE performs an uplink timing advance for the first cell based on one or more timing advance control signals received on the first active BWP, and the UE performs a timing advance for the second cell based on a timing advance determined, in accordance with one feature of the invention, based on: i) the timing advance for the first cell or ii) timing information received after transmission of a PRACH signal triggered from a control signal received on the active first BWP.

With the uplink timing advance being set for each of the first and second cells, in step 1418 the UE transmits data using the first BWP and the first timing advance commanded by a first base station of the first cell and transmits data on the second BWP using a second timing advance determined for the second cell and thus for uplink transmission on the second BWP of the second cell.

Having used the granted resources in step 1414 to transmit or receive data, operation proceeds from step 1414 to stop step 1420 pending the routine 1400 being called with regard to another grant message.

From FIG. 14 it should be appreciated that a UE can receive a multi-cell grant message in accordance with the invention which grants resources for both an active cell and a dormant cell, in an single message and proceed to using the granted resources for uplink and/or downlink signaling without having to first switch the dormant cell to being an active cell with the UE then having to monitor in the second cell for grant messages relating to the second cell. Thus the methods described herein can and do have latency advantages over prior art systems where a message could be used to trigger a change from a dormant and active state followed by resource grants in the switched cell before uplink/downlink resources could be used by a UE to transmit data, e.g., application data, on a physical data channel of the second cell.

The timing determination routine 1500 shown in FIG. 15, which can be called by the grant processing routine 1400 shown in FIG. 14 will now be discussed. The routine 1500 begins in start step 1502 and proceeds to steps 1504, 1506 and 1508 which can be performed in parallel or sequentially. In step 1504 the UE determines downlink timing for the active first bandwidth part (BWP) based on signals, e.g., timing reference signals, transmitted by the first base station of the first cell and received by the UE on the first BWP. In step 1506 the UE sets an uplink timing advance for the first BWP of the first cell based on timing control signals, e.g., absolute or relative timing control signals, received on the first BWP from the first base station. In step 1508 the UE determines downlink timing for the second BWP corresponding to the second cell based on signals received on the second BWP, e.g., broadcast timing reference signals or other reference signals. The downlink timing for the second dormant BWP is determined in some embodiments without monitoring a physical downlink control channel (PDCCH) of the second BWP of the second cell to which the second BWP corresponds.

Operation proceeds from steps 1504, 1506 and 1508 to step 1510. In step 1510 a check is made to determine if the resource grant, which triggered or resulted in the call to the timing determination routine, included a grant of uplink resources for a dormant BWP, e.g., of uplink resources for the second BWP corresponding to the dormant second cell.

If the resource grant which triggered the timing determination routine call does not include a grant of uplink resources for the dormant BWP, the timing information generated in steps 1504, 1506 and 1508 is sufficient to use the granted resources and operation proceeds from decision step 1510 to timing information return step 1522 in which the determined timing information is retuned to the UE routine 1400, which called the timing determination routine, to facilitate use of the granted resources.

If however in step 1510 it is determined that the resource grant which triggered the call to routine 1500 included a grant of uplink resources for a dormant BWP, operation proceeds along to one of steps 1514 or 1518 so that an uplink timing advance for the dormant BWP can be determined. While decision step 1512 is included, in some embodiments a single one of the two timing advance determination techniques is supported with the device using steps 1514 and 1516 in one embodiment and steps 1518 and 1520 in another embodiment. In the example shown in FIG. 15 both techniques for determining uplink timing advance on the dormant BWP are supported with operation proceeding to step 1514 in the case where a PRACH was not triggered prior to the received uplink grant and to step 1518 in the case where a PRACH was triggered to be transmitted on the second BWP, e.g., by a signal sent on the first active BWP. In step 1512 if it is determined that a control signal to trigger a PRACH signal on the second BWP was not received prior to the time the granted resources are to be used, e.g., to allow for uplink timing signal measurement by the second BS of the second cell and sending of timing information to the UE, operation proceeds from step 1512 to step 1514.

In step 1514 the UE determines a timing offset between the first cell and the second cell based on received downlink signals received from the first and second cells, respectively. Then in step 1516 the UE determines an uplink timing advance to be used for the second cell, and thus the second BWP corresponding to the second cell, based on the uplink timing advance for the first cell, e.g., determined in step 1506, and the determined timing offset between the first and second cells, e.g., determined in step 1514. In some embodiments the timing advance further depends on a fixed TAG time offset relating to a timing difference between the first and second cells uplink timing. A computation which can be used in step 1516 to determine the second cell timing advance is discussed further elsewhere in the present application.

With the second cell uplink timing advance having been determined in step 1516 operation proceeds to return step 1522 which returns the timing information determined by routine 1500 to be used in controlling use of the granted resources.

In the case where a PRACH from the UE was triggered to the second base station prior to the granted resource time, operation will proceed from step 1512 to step 1518. In step 1518 the UE receives secondary Timing Advance Group (sTAG) information corresponding to the second cell. This information is based, in some embodiments, a measurement of the PRACH signal received time which provides the second base station of the second cell information about the UE's relative uplink timing. The STAG information can be, and sometimes is, communicated to the UE via the second BWP but in other embodiments is communicated from the second cell or second base station to the UE via the first cell and first BWP.

In step 1520 the uplink timing advance to be used for the second cell and thus the second BWP is determined based on the received sTAG information relating to the timing group to which the second (dormant) cell belongs.

With the second cell uplink timing advance having been determined in step 1520 operation proceeds to return step 1522 which returns the timing information determined by routine 1500 to be used in controlling use of the granted resources.

Figure 16:
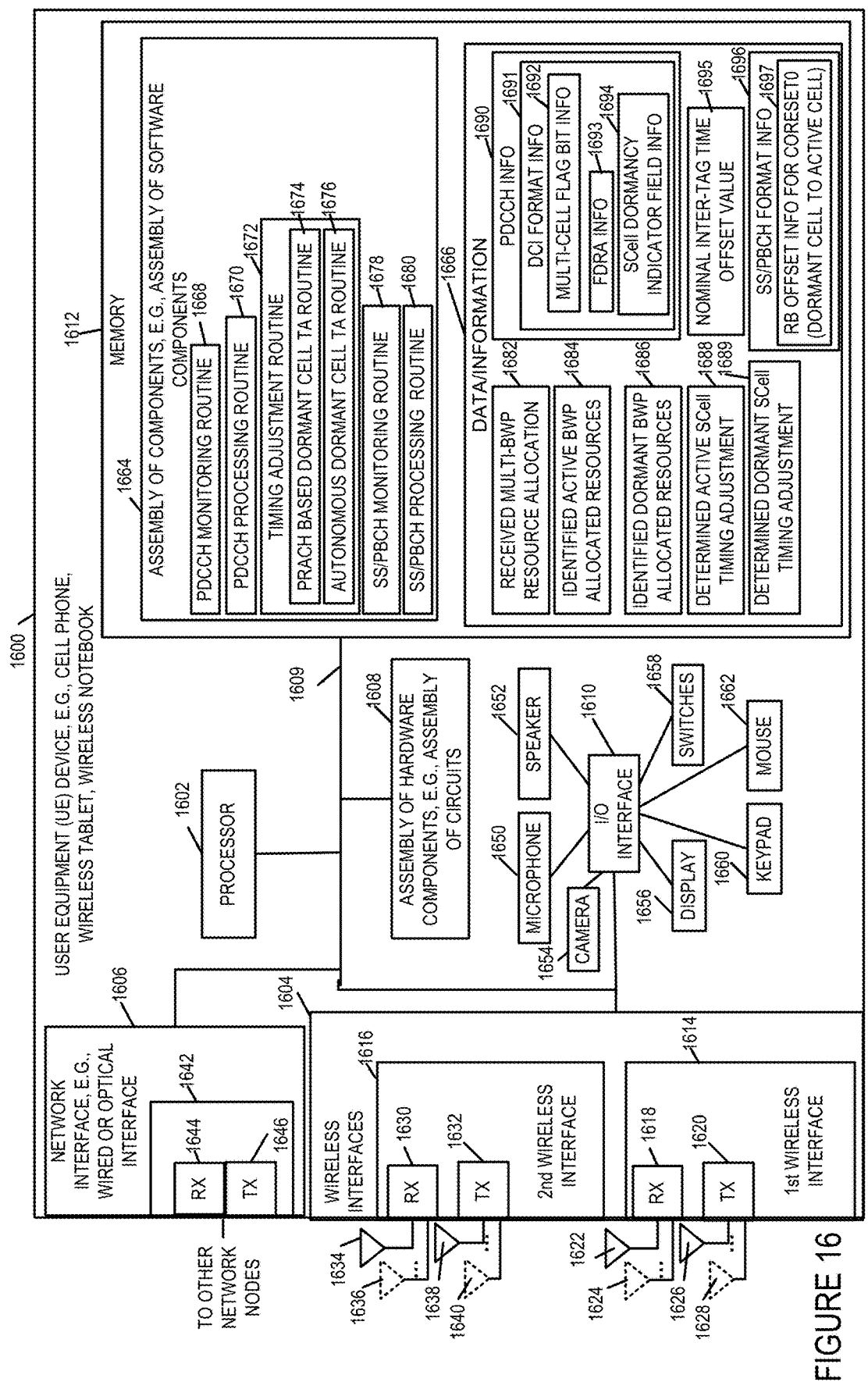
FIG. 16 is a drawing of an exemplary user equipment (UE) device in accordance with an exemplary embodiment.

FIG. 16 is a drawing of an exemplary user equipment (UE) device 1600 in accordance with an exemplary embodiment. Exemplary EU device 1600 is, e.g. one of the UE devices described with respect to any of the FIGS. 5-18, and/or a UE device implementing steps of a method in accordance with an exemplary embodiment of the present invention, e.g. the methods of any of: flowchart 900 of FIG. 9, flowchart 1200 of FIG. 12, flowchart 1300 of FIG. 13, flowchart 1400 of FIG. 14, and/or flowchart 1500 of FIG. 15.

Exemplary UE device 1600 includes a processor 1602, e.g., a CPU, a wireless interface 1604, a network interface 1606, an assembly of hardware components 1608, e.g. assembly of circuits, an I/O interface 1610, and memory 1612 coupled together via a bus 1609 over which the various elements may interchange data and information.

Wireless interface 1604 includes a 1st wireless interface 1614 and a second wireless interface 1616. The 1st wireless interface 1604 includes a receiver (RX) 1618 coupled on one or more receive antennas or antenna elements (1622, . . . 1624), via which the UE device 1600 may receive downlink wireless signals, e.g., from base stations, e.g. PCell base stations and SCell base stations. The 1st wireless interface 1614 further includes a transmitter (TX) 1628 coupled on one or more transmit antennas or antenna elements (1626, . . . 1628), via which the UE device 1600 may transmit uplink wireless signals, e.g., to a base station, e.g. PCell base station or SCell base station.

The 2nd wireless interface 1616 includes a receiver (RX) 1630 coupled on one or more receive antennas or antenna elements (1634, . . . 1636), via which the UE device 1600 may receive downlink wireless signals, e.g., from base stations, e.g. PCell base stations and SCell base stations. The 2nd wireless interface 1616 further includes a transmitter (TX) 1632 coupled on one or more transmit antennas or antenna elements (1638, . . . 1640), via which the UE device 1600 may transmit uplink wireless signals, e.g., to a base station, e.g. PCell base station or SCell base station.

Network interface 1606, e.g., a wired or optical interface, includes a receiver 1644 and a transmitter 1646. In some embodiments, the receiver 1644 and transmitter 1646 are part of a transceiver chip 1642. The network interface may, and sometimes does, couples the UE device, to network nodes, e.g. via a landline connection.

UE device 1600 further includes a plurality of various input/output devices (microphone 1650, speaker 1652, camera 1654, display 1656, e.g., a touch screen display, switches 1658, a keypad 1660, and mouse 1622). The various input/output devices are coupled via I/O interface 1610 to internal bus 1609.

Memory 1612 includes an assembly of components 1664, e.g., assembly of software components, e.g. software routines and/or software modules, and data/information 1666. Assembly of components 1664 includes a PDCCH monitoring routine 1668, a PDCCH processing routine 1670, a timing adjustment routine 1672, a SS/PBCH monitoring routine 1678 and a SS/PBCH processing routine 1680. The timing adjustment routine 1672 includes a PRACH based dormant cell TA routine 1674, e.g. implementing a method described with respect to FIG. 7 and an autonomous dormant cell TA adjustment routine 1680, e.g. implementing a method described with respect to FIG. 8.

Data/information 1666 includes a received multi-BWP resource allocation 1680, identified active BWP allocated resources 1684, identified dormant BWP allocated resources 1686, a determined active SCell timing adjustment 1688, and a determined dormant SCell timing adjustment 1689. Data/information 1666 further includes PDCCH information 1690 including DCI format information 1691. The DCI format information 1691 includes multi-cell flag bit information 1692, FDRA information 1693, and SCell dormancy indicator field information 1694. Data/information 1666 further includes a nominal inter-tag time offset value 1695, e.g. a stored value for Z as described with respect to FIG. 8. Data/information 1666 further includes SS/PBCH format information 1696 including RB offset information for CORESET0, e.g. dormant cell to active cell offset information, e.g. to be used in searches. SS/PBCH format information includes, e.g. table 1100 of FIG. 11.

Figure 17:
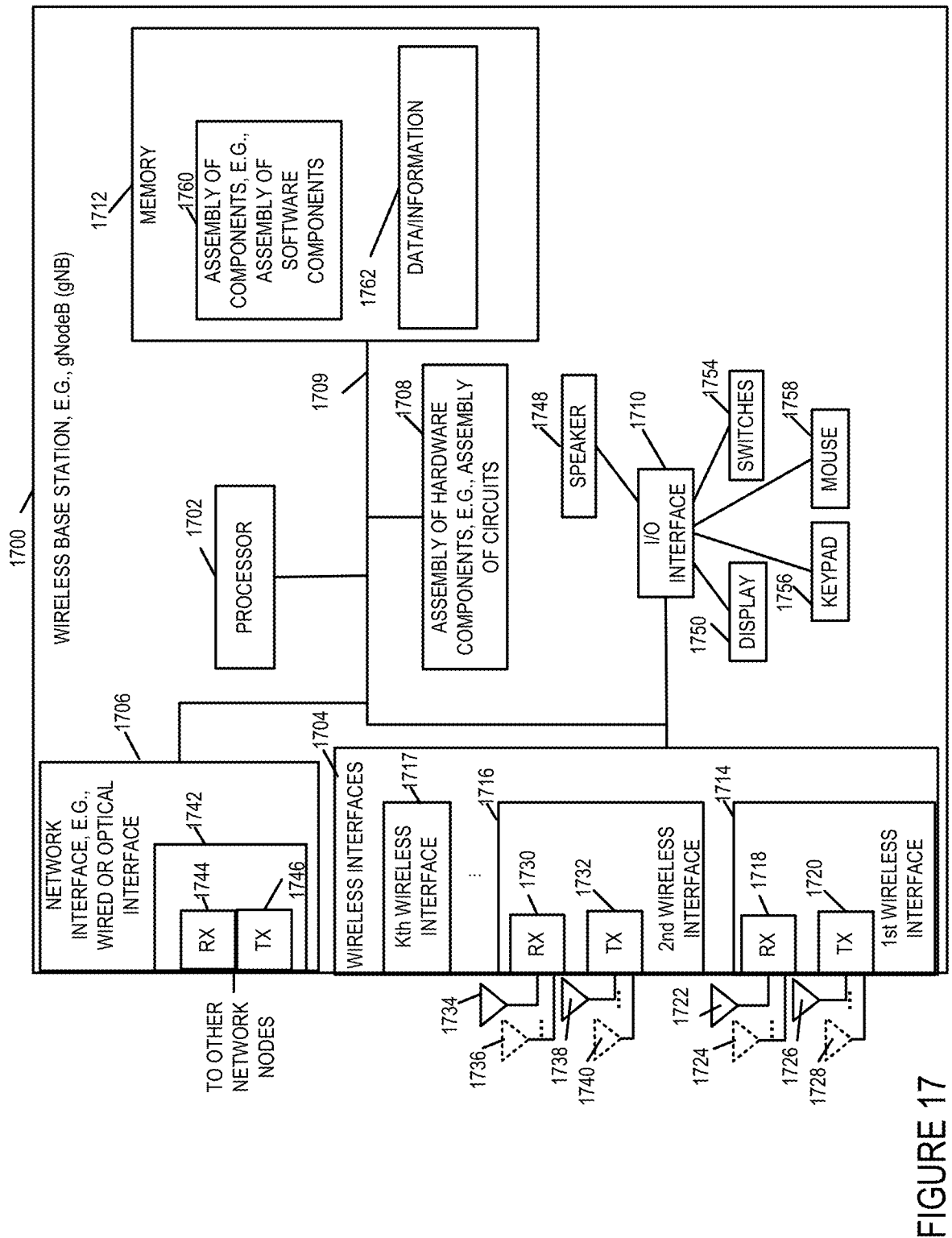
FIG. 17 is a drawing of an exemplary base station, e.g. a gNodeB (gNB) in accordance with an exemplary embodiment.

FIG. 17 is a drawing of an exemplary base station 1700, e.g. a gNodeB (gNB) in accordance with an exemplary embodiment. Exemplary base station 1700 is, e.g., any of the base stations of system 1800 of FIG. 18, a base station described with respect to any of FIGS. 5-18, and/or described with respect to any of described exemplary methods. Exemplary base station is, e.g. a SCell base station. Exemplary base station 1700 includes a processor 1702, e.g., a CPU, a wireless interface 1704, a network interface 1706, an assembly of hardware components 1708, e.g. assembly of circuits, an I/O interface 1710, and memory 1712 coupled together via a bus 1709 over which the various elements may interchange data and information.

Wireless interfaces 1704 includes a plurality of wireless interface (1st wireless interface 1714, second wireless interface 1716, . . . , kth wireless interface 1717). The 1st wireless interface 1704 includes a receiver (RX) 1718 coupled on one or more receive antennas or antenna elements (1722, . . . 1724), via which the base station 1700 may receive uplink wireless signals, e.g., from UEs. The 1st wireless interface 1714 further includes a transmitter (TX) 1720 coupled on one or more transmit antennas or antenna elements (1726, . . . 1728), via which the base station 1700 may transmit downlink wireless signals, e.g., to UEs.

The 2nd wireless interface 1716 includes a receiver (RX) 1730 coupled on one or more receive antennas or antenna elements (1734, . . . 1736), via which the base station 1700 may receive uplink wireless signals, e.g., from UEs. The 2nd wireless interface 1716 further includes a transmitter (TX) 1732 coupled on one or more transmit antennas or antenna elements (1738, . . . 1740), via which the base station 1700 may transmit downlink wireless signals, e.g., to UEs.

Network interface 1706, e.g., a wired or optical interface, includes a receiver 1744 and a transmitter 1746. In some embodiments, the receiver 1744 and transmitter 1746 are part of a transceiver chip 1742. The network interface may, and sometimes does, couples the base station, to other network nodes, e.g. other base station, servers, gateways, core network nodes, etc.

Base station 1700 further includes a plurality of various input/output devices (speaker 1748, 1652, display 1740, switches 1754, a keypad 1756, and mouse 1758). The various input/output devices are coupled via I/O interface 1710 to internal bus 1709.

Memory 1712 includes an assembly of components 1760, e.g., assembly of software components, e.g. software routines and/or software modules, and data/information 1762.

Figure 18:
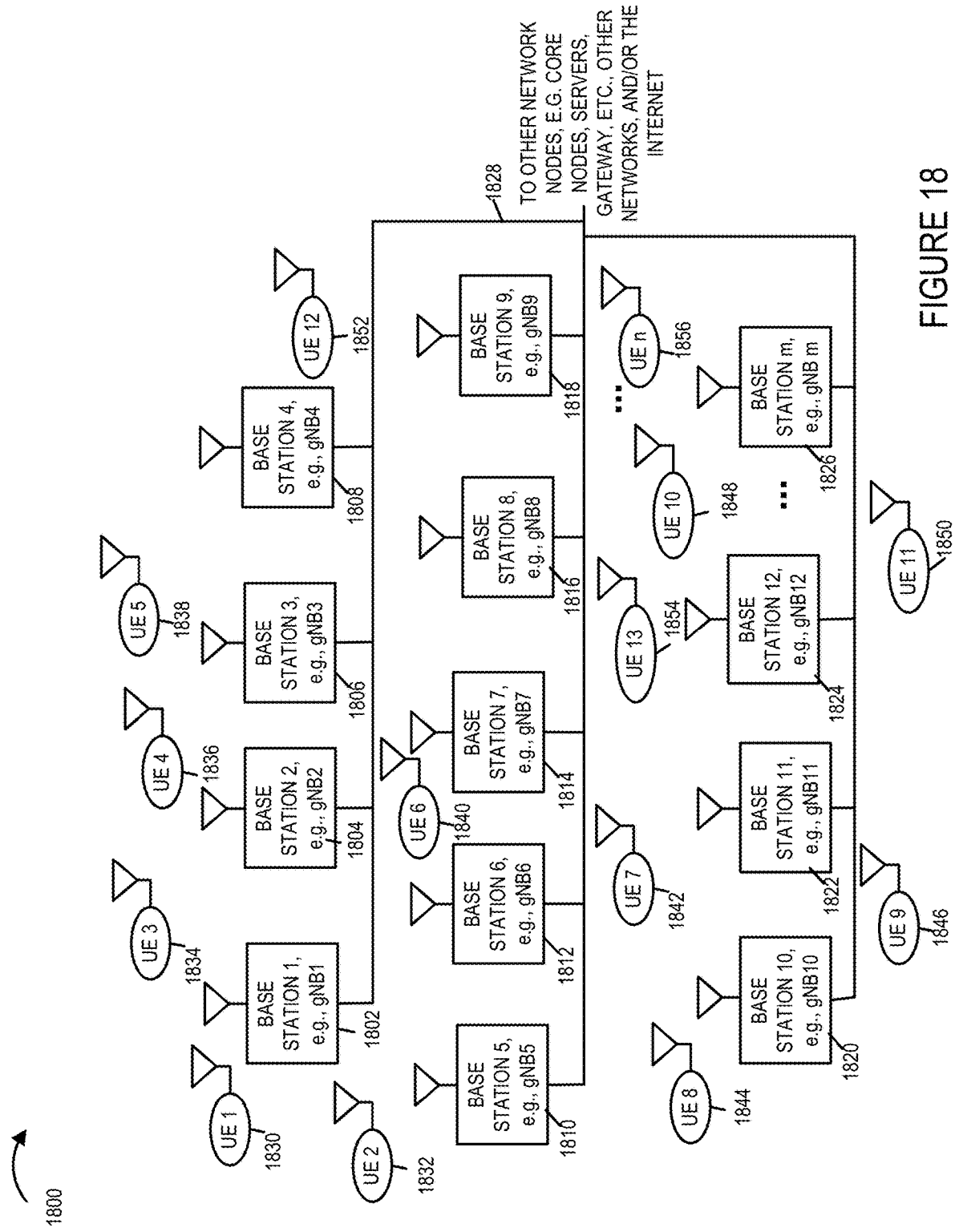
FIG. 18 is a drawing of an exemplary communications system in accordance with an exemplary embodiment.

FIG. 18 is a drawing of an exemplary communications system 1800 in accordance with an exemplary embodiment. Exemplary communications system includes a plurality of base stations (base station 1 1802, e.g., gNB1, base station 2 1804, e.g., gNB2, base station 3 1806, e.g., gNB3, base station 4 1808, e.g., gNB4, base station 5 1810, e.g., gNB5, base station 6 1812, e.g., gNB6, base station 7 1814, e.g., gNB7, base station 8 1816, e.g., gNB8, base station 9 1818, e.g., gNB9, base station 10 1820, e.g., gNB10, base station 12 1822, e.g., gNB12, base station 4 1824, e.g., gNB12, . . . , base station m 1828, e.g., gNB m) coupled together via a backhaul network 1826 and/or coupled to other network nodes, e.g. servers, core network nodes, gateways, other networks and/or the Internet. Different base stations in system 1800 may have different coverage ranges and/or operate on different carrier frequencies. Some of the cell coverage areas are partially overlapping. Some cell coverage areas are fully over lapping with respect to one or more other cells. In various embodiments, the base stations support communications using NR technology and/or protocols in the frequency range of 56.6 GHz-71 GHz.

Exemplary communications system 1800 further includes a plurality of user equipment devices (UE 1 1830, UE 2 1832, UE 3 1834, UE 4 1836, UE 5 1838, UE 6 1840, UE 7 1842, UE 8 1844, UE 9, 1846, UE 10 1848, UE 11 1850, UE 12 1852, UE 13 1854, . . . , UE n 1856). At least some of the UEs are mobile devices. The UEs (1830, 1832, 1834, 1836, 1838, 1840, 1842, 1844, 1846, 1848, 1852, 1854, . . . , 1856), are, e.g., implemented as exemplary UE 1600 of FIG. 16. The UEs may, and sometimes do, receive PDDCH signals from an active BWP communicating a multi-BWP grant, e.g., for a PDSCH or PUSCH, for: an active BWP and a dormant BWP, e.g. which are adjacent. UEs, may, and sometimes do, determine timing advance for a dormant BWP based on a PRACH triggered by a signal received in a PDCCH of an active BWP. UEs may, and sometimes do monitor and receive SS/PBCH blocks from dormant BWPs communicating information, e.g. offset information, used to identify the location of a control information block, e.g. of an active BWP, e.g., using a different carrier than is being used by the detected dormant BWP.

Numbered List of Exemplary Method Embodiments

Method Embodiment 1 relates to Embodiments including multi-cell grants in which a single grant, sent in an active BWP (e.g., via a DCCH of the active BWP), grants resources (e.g., PDSCH or PUSCH resources) of an active BWP of a first cell and a dormant BWP of a second cell to a UE. The UE monitors for and receives the multi-cell grant in the active BWP (e.g. via DCCH in active BWP) and the UE need not monitor the dormant BWP DCCH.

Method Embodiment 1 A method of operating a user equipment (UE) device, the method comprising: receiving (1318) a first resource grant (e.g., data channel resource assignment) from a first base station of a first cell on a first bandwidth part (BWP) corresponding to the first cell said first cell being an active cell; determining (1404) (e.g., does the first resource grant include a multi-cell flag bit indicating that the grant is a multi-cell grant and SCell dormancy information, where the cell dormancy information indicates a second dormant cell or a dormant second bandwidth part (BWP) of a second dormant cell) based on the content of the received resource grant if the first resource grant includes a grant of resources for a dormant bandwidth part (BWP) corresponding to a second cell (e.g., a BWP of SCell B which is dormant with respect to the UE); and using (1414) resources granted by the first resource grant to transmit or receive data, said step of using resources including using granted resources in the dormant second cell to transmit (1418) or receive (1416) data when it is determined that the first resource grant includes a grant of resources for a dormant bandwidth part corresponding to the second cell.

Method Embodiment 1AA The method of Method Embodiment 1, wherein the first resource grant is a multi-cell resource grant which includes: i) a first BWP indicator field indicating a BWP of the active cell corresponding to the PDCCH on which the first resource grant was received, ii) a secondary Cell (SCell) dormancy indication field indicating a dormant cell to which the dormant second BWP corresponds, and ii) a one bit flag (e.g., a multi-cell flag bit set to 1) indicating that the first resource grant message grants resources corresponding to multiple cells (where in some embodiments the first cell to which the grant relates is an active secondary cell and the second cell to which the grant relates is a dormant secondary cell and where in some embodiment the SCell dormancy indication field is used to identify the second cell).

Method Embodiment 2 The method of Method Embodiment 1, wherein determining (1404) based on the content of the received resource grant if the first resource grant includes a grant of resources for a dormant bandwidth part (BWP) corresponding to a second cell includes: determining (1405) if the first resource grant includes a multi-cell flag (e.g., a 1 bit flag) set to a value (e.g., 1) indicating that the grant is a multi-cell grant.

Method Embodiment 2A The method of Method Embodiment 2, wherein receiving (1318) a first resource grant includes receiving the first resource grant on a physical downlink control channel (PDCCH) of the first BWP of the first cell; wherein the first resource grant includes, in addition to said multi-cell flag, i) a BWP indicator field providing information indicating the BWP of the first cell to which the first resource grant relates and ii) an SCell dormancy indication field identifying the second BWP of the second dormant cell to which the grant relates or the dormant second cell to which the first resource grant relates.

Method Embodiment 3 The method of Method Embodiment 2, wherein said step determining (1405) if the first resource grant includes a multi-cell flag (e.g., a 1 bit flag) set to a value (e.g., 1) indicating that the grant is a multi-cell grant includes determining that the first resource grant includes the multi-cell flag set to the value indicating that the grant is a multi-cell grant; and wherein using (1414) resources granted by the first resource grant to transmit or receive data includes using resources in both the active first BWP of the first cell and dormant second BWP of the second cell to receive or transmit data.

Method Embodiment 4 The method of Method Embodiment 3, wherein said first and second cells are both secondary cells used by the first UE.

Method Embodiment 5 The method of Method Embodiment 1, wherein using (1414) resources granted by the first resource grant to transmit or receive data includes using resources in both the active first BWP of the first cell and dormant second BWP of the second cell to receive or transmit data is performed without the UE receiving a separate resource grant on a PDCCH of the dormant second cell authorizing use of the downlink or uplink resources granted by the first resource grant (i.e., the UE does not need to, and does not receive, a resource grant sent on a PDCCH of the second cell (SCell B) prior to use of downlink or uplink resources granted by the first resource grant message).

Method Embodiment 6 The method of Method Embodiment 1, wherein the active first BWP and dormant second BWP are frequency adjacent BWPs.

Method Embodiment 6A The method of Method Embodiment 6, wherein the bandwidth used by the dormant secondary cell (e.g., the second cell) is larger than the bandwidth of the active secondary cell (e.g., the first cell).

Method Embodiment 7 The method of Method Embodiment 6, further comprising: determining (1411) which resources are granted in the second cell based on information included in said grant message identifying granted resources in the first cell (e.g., based on the BWP granted in the first cell and knowledge that the grant is for a frequency adjacent BWP in the second cell. In some cases the multiple BWPs are treated as a single logical BWP formed from contiguous virtual resource blocks. In some embodiments where the BWPs have different SCSs the virtual resource block (VRB) to physical resource block (PRB) mapping is scaled across a BWP border between the resources of the first cell and the resources of the second cell, e.g., with inter-carrier guard bands being excluded from the granted resources). (See description relating to FIG. 5)).

Method Embodiments 8-9 relate to solution 1 for UL timing sync problem with respect to dormant BWP—trigger PRACH in dormant BWP prior scheduling of a grant including a grant of resources for the dormant BWP—the PRACH trigger is sent using the PDCCH of the active BWP. The UE receives the PRACH trigger message on the active BWP and responds by sending a PRACH signal using the BWP of the dormant BWP prior to initiating monitoring of the PDCCH of the dormant BWP. Timing advance signals are then communicated to the UE for the dormant BWP, e.g., via downlink signaling on the PDCCH of the active cell or dormant BWP which the UE begins monitoring for TA signals, in some but not necessarily all embodiments, after sending the PRACCH. The UE can then adjust the timing for the dormant BWP prior to using the second BWP for uplink signaling, e.g., after receiving a single or multi-BWP grant granting uplink resources in the second BWP.

Method Embodiment 8 The method of Method Embodiment 1, further comprising: receiving (1316) (e.g., prior to receiving the first resource grant) a control signal on the first BWP of the active first cell (e.g., SCell A), a control signal that controls the UE device to send a Physical Random Access Channel (PRACH) signal using the dormant BWP of the second cell (SCell B).

Method Embodiment 8AA The method of Method Embodiment 8 wherein said PRACH signal is transmitted in response to the control signal received on the first BWP, said PRACH signal being transmitted without first performing PDCCH reception on the dormant second BWP (e.g., PRACH signaling is initiated via the active cell for the dormant BWP of the second without first having to initiate PDCCH monitoring or the second cell and sending of the signal to initiate PRACH signaling via the PDCCH of the second BWP. Thus the PRACH signal on the second BWP is sent in some embodiments without the UE receiving a command or control signal on the second BWP to trigger the PRACH transmission on the dormant second BWP).

Method Embodiment 9 The method of Method Embodiment 8, further comprising: transmitting (1323) a PRACH signal on the dormant second BWP in response to receiving the control signal on the first BWP that controls the UE to send the PRACH signal using the dormant BWP; and receiving (1518) on the first BWP or second BWPs timing information (e.g., a timing advance control signal) for the second cell generated based on said transmitted PRACH signal.

Method Embodiment 8AAA The method of Method Embodiment 8AA, wherein the control signal is a DCI Format 1_0 message sent using the PDCCH of the first active BWP of the first cell (SCell A) the DCI Format 1_0 message including a carrier indicator or dormancy indication field used to indicate that PRACH signaling is to be performed using the second dormant BWP. (In this way the active BWP can and sometimes is used to trigger PRACH signaling on a dormant BWP so that the base station to which the dormant BWP transmits can measure the receipt time of the PRACH and provide timing advance information for the dormant BWP either via the active BWP of the active cell or via the dormant BWP, e.g., in a broadcast signal sent on the dormant second BWP.

Method Embodiment 10 The method of Method Embodiment 9, wherein using (1414) resources granted by the first resource grant to transmit or receive data includes: performing a timing advance operation (1417) with respect to the second cell prior to transmitting data (1418) in the second BWP.

Method Embodiments 11-13 relate to Timing advance solution 2 for UL timing sync problem with respect to dormant BWP—where the timing advance is computed from the timing advance for the first cell, downlink signals from which a timing difference between cells is determined and optionally a tag time offset corresponding to the second cell when a timing advance is generated from the timing advance of the first cell.

Method Embodiment 11 The method of Method Embodiment 1, further comprising: determining (1516) a timing advance to be used for transmission on the second BWP based on a timing offset between the first and second cells determined from downlink signals received from said first and second cells and a timing advance for the first cell, said timing advance for the first cell being based on at least one timing advance control signal that was received from the first cell.

Method Embodiment 12 The method of Method Embodiment 11, wherein the timing advance to be used for transmission on the second BWP is further based on a TAG time offset to be used when computing the timing advance for the second cell from the timing advance for the first cell.

Method Embodiment 13 The method of Method Embodiment 12, further comprising: performing a timing advance operation (1417) for the second BWP using the timing advance determined based on the timing advance for the first cell.

Method Embodiments 14-16 relate to embodiments in which a dormant BWP adds an additional set of DL transmissions (SS/PBCH blocks) that a UE may expect to receive on the dormant BWP. The additional SS/PBCH blocks of the dormant BWPs provide additional time-frequency tracking, beam management, and CSI estimation opportunities; enable mobility measurements such as RSRP/RSRQ; and for an idle UE, seeking to perform initial access, can point the UE to an active cell, e.g. by providing an inter-cell resource block offset.

Method Embodiment 14 The method of Method Embodiment 1 further comprising: monitoring for and receiving (1350) a set of transmissions on Synchronization Signal/Physical Broadcast Channel (SS/PBCH) blocks on a dormant BWP.

Method Embodiment 15 The method of Method Embodiment 14, further comprising: obtaining (1352) information from a SS/PBCH block received on a dormant bandwidth portion that indicates where a CORESET of information is located in an active BWP.

Method Embodiment 16 The method of Method Embodiment 15, wherein said information includes an inter-cell resource block offset.

Numbered List of Exemplary Apparatus Embodiments

Apparatus Embodiment 1 relates to Embodiments including multi-cell grants in which a single grant, sent in an active BWP (e.g., via a DCCH of the active BWP), grants resources (e.g., PDSCH or PUSCH resources) of an active BWP of a first cell and a dormant BWP of a second cell to a UE. The UE monitors for and receives the multi-cell grant in the active BWP (e.g. via DCCH in active BWP) and the UE need not monitor the dormant BWP DCCH.

Apparatus Embodiment 1 A user equipment (UE) device (1600), the UE device comprising: a first wireless receiver (1618); and a processor (1602) configured to: operate the first wireless receiver (1618) to receive (1318) a first resource grant (e.g., data channel resource assignment) from a first base station of a first cell on a first bandwidth part (BWP) corresponding to the first cell said first cell being an active cell; determine (1404) (e.g., does the first resource grant include a multi-cell flag bit indicating that the grant is a multi-cell grant and SCell dormancy information, where the cell dormancy information indicates a second dormant cell or a dormant second bandwidth part (BWP) of a second dormant cell) based on the content of the received resource grant if the first resource grant includes a grant of resources for a dormant bandwidth part (BWP) corresponding to a second cell (e.g., a BWP of SCell B which is dormant with respect to the UE); and operate the first UE device to use (1414) resources granted by the first resource grant to transmit or receive data, said step of using resources including using granted resources in the dormant second cell to transmit (1418) or receive (1416) data when it is determined that the first resource grant includes a grant of resources for a dormant bandwidth part corresponding to the second cell.

Apparatus Embodiment 1AA The UE device (1600) of Apparatus Embodiment 1, wherein the first resource grant is a multi-cell resource grant which includes: i) a first BWP indicator field indicating a BWP of the active cell corresponding to the PDCCH on which the first resource grant was received, ii) a secondary Cell (SCell) dormancy indication field indicating a dormant cell to which the dormant second BWP corresponds, and ii) a one bit flag (e.g., a multi-cell flag bit set to 1) indicating that the first resource grant message grants resources corresponding to multiple cells (where in some embodiments the first cell to which the grant relates is an active secondary cell and the second cell to which the grant relates is a dormant secondary cell and where in some embodiment the SCell dormancy indication field is used to identify the second cell).

Apparatus Embodiment 2 The UE device (1600) of Apparatus Embodiment 1, wherein said processor (1602) is configured to: determine (1405) if the first resource grant includes a multi-cell flag (e.g., a 1 bit flag) set to a value (e.g., 1) indicating that the grant is a multi-cell grant, as part of being configured to determine (1404) based on the content of the received resource grant if the first resource grant includes a grant of resources for a dormant bandwidth part (BWP) corresponding to a second cell.

Apparatus Embodiment 2A The UE device (1600) of Apparatus Embodiment 2, wherein said processor (1602) is configured to operate the first wireless receiver (1618) to: receive the first resource grant on a physical downlink control channel (PDCCH) of the first BWP of the first cell, as part of being configured to operate the first wireless receiver to receive (1318) the first resource grant; and wherein the first resource grant includes, in addition to said multi-cell flag, i) a BWP indicator field providing information indicating the BWP of the first cell to which the first resource grant relates and ii) an SCell dormancy indication field identifying the second BWP of the second dormant cell to which the grant relates or the dormant second cell to which the first resource grant relates.

Apparatus Embodiment 3 The UE device (1602) of Apparatus Embodiment 2, wherein said step determining (1405) if the first resource grant includes a multi-cell flag (e.g., a 1 bit flag) set to a value (e.g., 1) indicating that the grant is a multi-cell grant includes determining that the first resource grant includes the multi-cell flag set to the value indicating that the grant is a multi-cell grant; and wherein said processor (1602) is configured to operate the UE device (1600) to: use resources in both the active first BWP of the first cell and dormant second BWP of the second cell to receive or transmit data, as part of being configured to operate the UE device to use (1414) resources granted by the first resource grant to transmit or receive data.

Apparatus Embodiment 4 The UE device (1600) of Apparatus Embodiment 3, wherein said first and second cells are both secondary cells used by the first UE.

Apparatus Embodiment 5 The UE device (1600) of Apparatus Embodiment 1, wherein said processor (1602) is configured to operate the UE device (1600) to use resources in both the active first BWP of the first cell and dormant second BWP of the second cell to receive or transmit data is performed without the UE receiving a separate resource grant on a PDCCH of the dormant second cell authorizing use of the downlink or uplink resources granted by the first resource grant, as part of being configured to operate the UE to use (1414) resources granted by the first resource grant to transmit or receive data. (i.e., the UE does not need to, and does not receive, a resource grant sent on a PDCCH of the second cell (SCell B) prior to use of downlink or uplink resources granted by the first resource grant message).

Apparatus Embodiment 6 The UE device (1600) of Apparatus Embodiment 1, wherein the active first BWP and dormant second BWP are frequency adjacent BWPs.

Apparatus Embodiment 6A The UE device (1600) of Apparatus Embodiment 6, wherein the bandwidth used by the dormant secondary cell (e.g., the second cell) is larger than the bandwidth of the active secondary cell (e.g., the first cell).

Apparatus Embodiment 7 The UE device (1600) of Apparatus Embodiment 6, wherein said processor (1602) is further configured to: determine (1411) which resources are granted in the second cell based on information included in said grant message identifying granted resources in the first cell (e.g., based on the BWP granted in the first cell and knowledge that the grant is for a frequency adjacent BWP in the second cell. In some cases the multiple BWPs are treated as a single logical BWP formed from contiguous virtual resource blocks. In some embodiments where the BWPs have different SCSs the virtual resource block (VRB) to physical resource block (PRB) mapping is scaled across a BWP border between the resources of the first cell and the resources of the second cell, e.g., with inter-carrier guard bands being excluded from the granted resources). (See description relating to FIG. 5)).

Apparatus Embodiments 8-9 relate to solution 1 for UL timing sync problem with respect to dormant BWP—trigger PRACH in dormant BWP prior scheduling of a grant including a grant of resources for the dormant BWP—the PRACH trigger is sent using the PDCCH of the active BWP. The UE receives the PRACH trigger message on the active BWP and responds by sending a PRACH signal using the BWP of the dormant BWP prior to initiating monitoring of the PDCCH of the dormant BWP. Timing advance signals are then communicated to the UE for the dormant BWP, e.g., via downlink signaling on the PDCCH of the active cell or dormant BWP which the UE begins monitoring for TA signals, in some but not necessarily all embodiments, after sending the PRACCH. The UE can then adjust the timing for the dormant BWP prior to using the second BWP for uplink signaling, e.g., after receiving a single or multi-BWP grant granting uplink resources in the second BWP.

Apparatus Embodiment 8 The UE device (1602) of Apparatus Embodiment 1, wherein said processor (1602) is further configured to operate the first receiver (1618) to: receive (1316) (e.g., prior to receiving the first resource grant) a control signal on the first BWP of the active first cell (e.g., SCell A), a control signal that controls the UE device to send a Physical Random Access Channel (PRACH) signal using the dormant BWP of the second cell (SCell B).

Apparatus Embodiment 8AA The UE device (1600) of Apparatus Embodiment 8 wherein said PRACH signal is transmitted in response to the control signal received on the first BWP, said PRACH signal being transmitted without first performing PDCCH reception on the dormant second BWP (e.g., PRACH signaling is initiated via the active cell for the dormant BWP of the second without first having to initiate PDCCH monitoring or the second cell and sending of the signal to initiate PRACH signaling via the PDCCH of the second BWP. Thus the PRACH signal on the second BWP is sent in some embodiments without the UE receiving a command or control signal on the second BWP to trigger the PRACH transmission on the dormant second BWP).

Apparatus Embodiment 9 The UE device (1600) of Apparatus Embodiment 8, further comprising: a wireless transmitter (1632) (e.g., second wireless transmitter); and wherein said processor (1602) is further configured to: operate the wireless transmitter (1632) (e.g., second wireless transmitter) to transmit (1323) a PRACH signal on the dormant second BWP in response to receiving the control signal on the first BWP that controls the UE to send the PRACH signal using the dormant BWP; and operate a wireless receiver (1618 or 1630) (e.g., first or second wireless receiver) to receive (1518) on the first BWP or second BWPs timing information (e.g., a timing advance control signal) for the second cell generated based on said transmitted PRACH signal.

Apparatus Embodiment 8AAA. The UE device (1600) of Apparatus Embodiment 8AA, wherein the control signal is a DCI Format 1_0 message sent using the PDCCH of the first active BWP of the first cell (SCell A) the DCI Format 1_0 message including a carrier indicator or dormancy indication field used to indicate that PRACH signaling is to be performed using the second dormant BWP. (In this way the active BWP can and sometimes is used to trigger PRACH signaling on a dormant BWP so that the base station to which the dormant BWP transmits can measure the receipt time of the PRACH and provide timing advance information for the dormant BWP either via the active BWP of the active cell or via the dormant BWP, e.g., in a broadcast signal sent on the dormant second BWP.

Apparatus Embodiment 10 The UE device (1600) of Apparatus Embodiment 9, wherein said processor (1602) is configured to: operate the UE (1600) to perform a timing advance operation (1417) with respect to the second cell prior to transmitting data (1418) in the second BWP, as part of being configured to operate the UE to use (1414) resources granted by the first resource grant to transmit or receive data.

Apparatus Embodiments 11-13 relate to Timing advance solution 2 where the timing advance is computed from the timing advance for the first cell, downlink signals from which a timing difference between cells is determined and optionally a tag time offset corresponding to the second cell when a timing advance is generated from the timing advance of the first cell.

Apparatus Embodiment 11 The UE device (1600) of Apparatus Embodiment 1, wherein said processor (1602) is further configured to: determine (1516) a timing advance to be used for transmission on the second BWP based on a timing offset between the first and second cells determined from downlink signals received from said first and second cells and a timing advance for the first cell, said timing advance for the first cell being based on at least one timing advance control signal that was received from the first cell.

Apparatus Embodiment 12 The UE device (1600) of Apparatus Embodiment 11, wherein the timing advance to be used for transmission on the second BWP is further based on a TAG time offset to be used when computing the timing advance for the second cell from the timing advance for the first cell.

Apparatus Embodiment 13 The UE device (1600) of Apparatus Embodiment 12, wherein said processor is further configured to: perform a timing advance operation (1417) for the second BWP using the timing advance determined based on the timing advance for the first cell.

Apparatus Embodiments 14-16 relate to embodiments in which a dormant BWP adds an additional set of DL transmissions (SS/PBCH blocks) that a UE may expect to receive on the dormant BWP. The additional SS/PBCH blocks of the dormant BWPs provide additional time-frequency tracking, beam management, and CSI estimation opportunities; enable mobility measurements such as RSRP/RSRQ; and for an idle UE, seeking to perform initial access, can point the UE to an active cell, e.g. by providing an inter-cell resource block offset.

Apparatus Embodiment 14 The UE device (1600) of Apparatus Embodiment 1, wherein said processor (1602) is further configured to: operate the UE to monitor for and receive (1350) a set of transmissions on Synchronization Signal/Physical Broadcast Channel (SS/PBCH) blocks on a dormant BWP.

Apparatus Embodiment 15 The UE device (1600) of Apparatus Embodiment 14, wherein said processor (1602) is further configured to: obtain (1352) information from a SS/PBCH block received on a dormant bandwidth portion that indicates where a CORESET of information is located in an active BWP.

Apparatus Embodiment 16 The UE device (1600) of Apparatus Embodiment 15, wherein said information includes an inter-cell resource block offset.

Numbered List of Exemplary Non-Transitory Computer Readable Medium Embodiments

A non-transitory computer readable medium (1612) including computer executable instructions which when executed by a processor (1602) of a user equipment (UE) device (1600) cause the UE device (1600) to perform the steps of: receiving (1318) a first resource grant (e.g., data channel resource assignment) from a first base station of a first cell on a first bandwidth part (BWP) corresponding to the first cell said first cell being an active cell; determining (1404) (e.g., does the first resource grant include a multi-cell flag bit indicating that the grant is a multi-cell grant and SCell dormancy information, where the cell dormancy information indicates a second dormant cell or a dormant second bandwidth part (BWP) of a second dormant cell) based on the content of the received resource grant if the first resource grant includes a grant of resources for a dormant bandwidth part (BWP) corresponding to a second cell (e.g., a BWP of SCell B which is dormant with respect to the UE); and using (1414) resources granted by the first resource grant to transmit or receive data, said step of using resources including using granted resources in the dormant second cell to transmit (1418) or receive (1416) data when it is determined that the first resource grant includes a grant of resources for a dormant bandwidth part corresponding to the second cell.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a user equipment (UE) device, the method comprising:
   receiving a control signal on an active first bandwidth part (BWP) of an active first cell, said control signal controlling the UE device to send a Physical Random Access Channel (PRACH) signal using a dormant second BWP corresponding to a dormant second cell;
   receiving a first resource grant from a first base station of the active first cell granting resources for the dormant second BWP corresponding to the dormant second cell; and
   using resources granted by the first resource grant to transmit or receive data in the dormant second cell.

2. The method of claim 1,
   wherein said first resource grant includes information identifying: i) the dormant second BWP corresponding to the dormant second cell or ii) the dormant second cell, to which the first resource grant relates; and
   wherein the method further comprises:
   determining, prior to using resources granted by the first resource grant to transmit or receive data in the dormant second cell, that the first resource grant includes a grant of resources for the dormant second BWP corresponding to the dormant second cell by determining that the first resource grant includes a multi-cell flag, in addition to said information identifying: i) the dormant second BWP corresponding to the dormant second cell or ii) the dormant second cell, to which the first resource grant relates, that is set to a value indicating that the grant is a multi-cell grant.

3. The method of claim 1, further comprising:
   using resources granted by the first resource grant to transmit or receive data in the active first BWP of the active first cell.

4. The method of claim 3, wherein said active first cell and said dormant second cell are both secondary cells used by the UE device.

5. The method of claim 3, wherein the active first BWP and dormant second BWP are frequency adjacent BWPs.

6. The method of claim 5, further comprising:
   determining which resources are granted in the dormant second cell based on information included in a grant message identifying granted resources in the active first cell.

7. The method of claim 1, wherein using resources granted by the first resource grant to transmit or receive data in the dormant second cell is performed without the UE device receiving a separate resource grant on a PDCCH of the dormant second cell authorizing use of the downlink or uplink resources granted by the first resource grant.

8. The method of claim 1, further comprising:
   transmitting said PRACH signal on the dormant second BWP in response to receiving the control signal on the active first BWP that controls the UE device to send the PRACH signal using the dormant second BWP; and
   receiving on the active first BWP or dormant second BWP timing information for the dormant second cell generated based on said transmitted PRACH signal.

9. The method of claim 1, further comprising:
   monitoring for and receiving a set of transmissions on Synchronization Signal/Physical Broadcast Channel (SS/PBCH) blocks on the dormant second BWP.

10. A method of operating a user equipment (UE) device, the method comprising:
    receiving a first resource grant from a first base station of an active first cell granting resources for a dormant second bandwidth part (BWP) corresponding to a dormant second cell;
    determining a timing advance to be used for transmission on the dormant second BWP based on a timing offset between the active first cell and the dormant second cell determined from downlink signals received from said active first cell and said dormant second cell and a timing advance for the active first cell, said timing advance for the active first cell being based on at least one timing advance control signal that was received from the active first cell; and
    using resources granted by the first resource grant to transmit or receive data in the dormant second cell.

11. The method of claim 10,
    wherein the timing advance to be used for transmission on the dormant second BWP is further based on a TAG time offset to be used when computing the timing advance for the dormant second cell from the timing advance for the active first cell,
    the method further comprising:
    performing a timing advance operation for the dormant second BWP using the timing advance determined based on the timing advance for the active first cell.

12. A method of operating a user equipment (UE) device, the method comprising:
   receiving a first resource grant from a first base station of an active first cell granting resources for a dormant second bandwidth part (BWP) corresponding to a dormant second cell;
   monitoring for and receiving a set of transmissions on Synchronization Signal/Physical Broadcast Channel (SS/PBCH) blocks on the dormant second BWP;
   obtaining information from a SS/PBCH block received on the dormant second BWP that indicates where a CORESET of information is located in an active first BWP, said information including an inter-cell resource block offset; and
   using resources granted by the first resource grant to transmit or receive data in the dormant second cell.

13. A user equipment (UE) device, the UE device comprising:
   a first wireless receiver; and
   a processor configured to:
      operate the UE device to receive a control signal on an active first bandwidth part (BWP) of an active first cell, said control signal controlling the UE device to send a Physical Random Access Channel (PRACH) signal using a dormant second BWP corresponding to a dormant second cell;
      operate the UE device to receive a first resource grant from a first base station of the active first cell granting resources for the dormant second BWP corresponding to the dormant second cell; and
      operate the UE device to use resources granted by the first resource grant to transmit or receive data in the dormant second cell.

14. The UE device of claim 13,
   wherein said first resource grant includes information identifying: i) the dormant second BWP corresponding to the dormant second cell or ii) the dormant second cell, to which the first resource grant relates; and
   wherein said processor is configured to:
   determine, prior to using resources granted by the first resource grant, if the first resource grant includes a multi-cell flag, in addition to said information identifying: i) the dormant second BWP corresponding to the dormant second cell or ii) the dormant second cell, to which the first resource grant relates, that is set to a value indicating that the grant is a multi-cell grant, said UE device use of resources granted by the first resource grant to transmit or receive data in the dormant second cell being based on said determining that the first resource grant includes the multi-cell flag set to said value indicating that the grant is a multi-cell grant.

15. The UE device of claim 13,
   wherein said processor is further configured to operate the UE device to:
      use resources granted by the first resource grant in the active first BWP of the active first cell to receive or transmit data.

16. The UE device of claim 13, further comprising:
   a wireless transmitter; and
   wherein said processor is further configured to:
      operate the wireless transmitter to transmit said PRACH signal on the dormant second BWP in response to receiving the control signal on the active first BWP that controls the UE to send the PRACH signal using the dormant second BWP; and
      operate said wireless receiver to receive on the active first BWP or the dormant second BWP timing information for the dormant second cell generated based on said transmitted PRACH signal.

17. A user equipment (UE) device, the UE device comprising:
   a first wireless receiver; and
   a processor configured to:
      operate the UE device to receive a first resource grant from a first base station of an active first cell granting resources for a dormant second bandwidth part (BWP) corresponding to a dormant second cell;
      determine a timing advance to be used for transmission on the dormant second BWP based on a timing offset between the active first cell and dormant second cell determined from downlink signals received from said active first cell and said dormant second cell and a timing advance for the active first cell, said timing advance for the active first cell being based on at least one timing advance control signal that was received from the active first cell and on a TAG time offset to be used when computing the timing advance for the dormant second cell from the timing advance for the active first cell; and
      operate the UE device to use resources granted by the first resource grant to transmit or receive data in the dormant second cell.

18. A non-transitory computer readable medium including computer executable instructions which when executed by a processor of a user equipment (UE) device cause the UE device to perform the steps of:
   receiving a control signal on an active first bandwidth part (BWP) of an active first cell, said control signal controlling the UE device to send a Physical Random Access Channel (PRACH) signal using a dormant second BWP corresponding to a dormant second cell;
   receiving a first resource grant from a first base station of the active first cell granting resources for the dormant second BWP corresponding to the dormant second cell; and
   using resources granted by the first resource grant to transmit or receive data in the dormant second cell.

* * * * *